United States Patent
Van Der Wiel

(10) Patent No.: US 9,689,767 B2
(45) Date of Patent: Jun. 27, 2017

(54) SEMICONDUCTOR PRESSURE SENSOR

(71) Applicant: MELEXIS TECHNOLOGIES NV, Tessenderlo (BE)

(72) Inventor: Appolonius Jacobus Van Der Wiel, Duisburg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 79 days.

(21) Appl. No.: 14/650,505

(22) PCT Filed: Dec. 10, 2014

(86) PCT No.: PCT/EP2014/077230
§ 371 (c)(1),
(2) Date: Jun. 8, 2015

(87) PCT Pub. No.: WO2015/086680
PCT Pub. Date: Jun. 18, 2015

(65) Prior Publication Data
US 2016/0265999 A1 Sep. 15, 2016

(30) Foreign Application Priority Data
Dec. 11, 2013 (GB) .................................. 1321867.2

(51) Int. Cl.
*G01L 9/06* (2006.01)
*G01L 19/04* (2006.01)
*G01L 9/00* (2006.01)

(52) U.S. Cl.
CPC ............ *G01L 9/065* (2013.01); *G01L 9/0055* (2013.01); *G01L 19/04* (2013.01)

(58) Field of Classification Search
CPC ... G01L 9/06; G01L 9/065; G01L 9/00; G01L 9/0055; G01L 19/04
See application file for complete search history.

(56) References Cited

U.S. PATENT DOCUMENTS

| 336,995 A | 3/1886 | Fischer |
| 4,672,411 A | 6/1987 | Shimizu et al. |
| (Continued) | | |

FOREIGN PATENT DOCUMENTS

| DE | 19701055 A1 | 7/1998 |
| DE | 102009026676 A1 | 12/2010 |
| (Continued) | | |

OTHER PUBLICATIONS

Great Britain Search Report for corresponding Great Britain Application No. 1321867.2, Sep. 15, 2014.
(Continued)

*Primary Examiner* — Nguyen Ha
(74) *Attorney, Agent, or Firm* — Workman Nydegger

(57) ABSTRACT

A semiconductor pressure sensor for measuring an external pressure exerted on the sensor, comprises a membrane, and a bridge comprising a first and a second resistor pair, arranged on a first resp. second side portion of the membrane. The first resistor pair comprises a first and a second resistor (R1, R2) comprising elongated piezo-resistive strips connected in series, and located closely together, such that R1 and R2 have substantially the same temperature. The sensor has a reduced sensitivity to: a temperature gradient over the membrane, and optionally also a non-uniform stress gradient caused by packaging and a inhomogeneous disturbing electric field perpendicular to the sensor. The piezo-resistive strips of the first and second resistor may be oriented in orthogonal directions of maximum piezo-resistive coefficients. A second bridge may be added outside the membrane, for compensating for package pressure.

20 Claims, 11 Drawing Sheets

(56) References Cited

U.S. PATENT DOCUMENTS

| | | | |
|---|---|---|---|
| 4,683,755 A * | 8/1987 | Samek | G01L 1/2293 |
| | | | 29/621.1 |
| 6,234,027 B1 | 5/2001 | Schatz | |
| 6,718,830 B1 * | 4/2004 | Johnson | G01L 9/065 |
| | | | 73/754 |
| 6,838,303 B2 | 1/2005 | Wang et al. | |
| 7,278,319 B2 | 10/2007 | Johnson | |
| 7,387,028 B1 | 6/2008 | Carver et al. | |
| 7,597,005 B2 | 10/2009 | McMonigal | |
| 8,561,461 B2 | 10/2013 | Van Der Wiel | |
| 9,157,826 B2 | 10/2015 | Krishna et al. | |
| 2004/0079159 A1 | 4/2004 | Muchow | |
| 2009/0120194 A1 * | 5/2009 | Rahn | G01L 9/0054 |
| | | | 73/715 |
| 2010/0043530 A1 | 2/2010 | Elian et al. | |
| 2015/0128713 A1 * | 5/2015 | Kakoiyama | G01L 9/0052 |
| | | | 73/721 |

FOREIGN PATENT DOCUMENTS

| | | |
|---|---|---|
| EP | 0083496 A2 | 7/1983 |
| EP | 0736756 A1 | 10/1996 |
| GB | 1547592 A | 6/1979 |
| WO | 96/22515 A1 | 7/1996 |
| WO | 9622515 A1 | 7/1996 |
| WO | 0140751 A1 | 6/2001 |

OTHER PUBLICATIONS

International Search Report for corresponding International PCT Application No. PCT/EP2014/077230, Mar. 12, 2015.

Extended European Search Report from corresponding EP Application No. 15171268.4, Nov. 11, 2015.

* cited by examiner

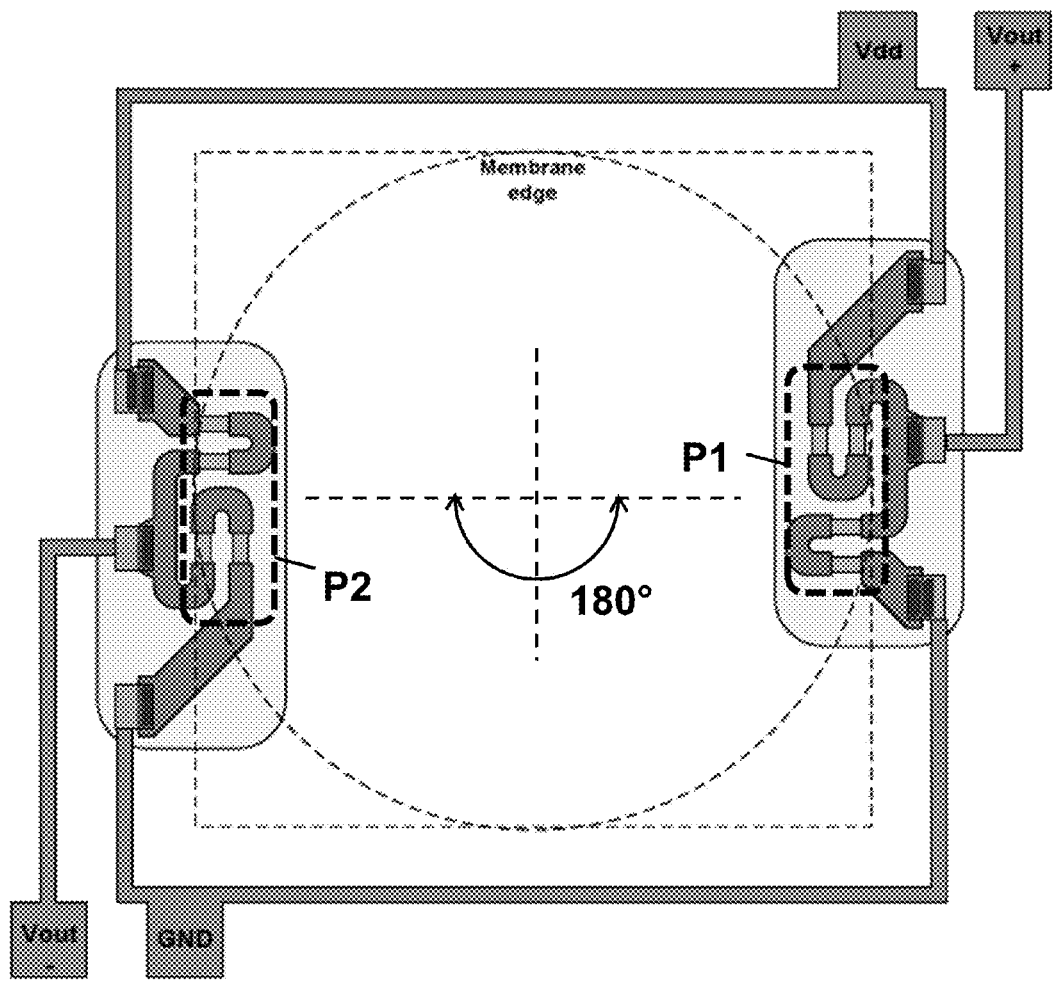
FIG. 13
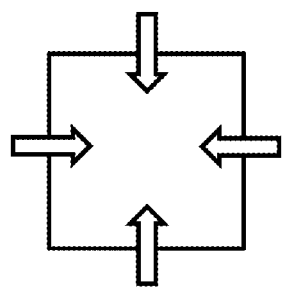  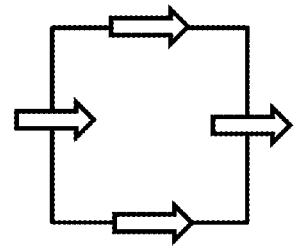
FIG. 14          FIG. 15

SEMICONDUCTOR PRESSURE SENSOR

FIELD OF THE INVENTION

The present invention relates to the field of pressure sensors, in particular pressure sensors integrated in a semiconductor-device.

BACKGROUND OF THE INVENTION

Semiconductor pressure sensors are known in the art.

U.S. Pat. No. 4,672,411 (Hitachi) discloses a pressure sensor (shown in FIG. 1) having a diaphragm formed in a semiconductor body, the diaphragm having a pair of pressure sensing semiconductor strips in a major surface thereof (vertical piezo-resistive strips 30, 31 in FIG. 1). Each of the strips 30, 31 is connected at one end to the other one by a semiconductor region (triangular region 32 in FIG. 1). The semiconductor region 32 is formed in a direction of small piezo-resistive coefficients, while the strips 30, 31 are formed in a direction of large piezo-resistive coefficients. The semiconductor region 32 (triangle) has a smaller sheet resistance than the resistance of the strips 30, 31. Also, electrode lead-out regions are provided at the other ends of the strips 30, 31, which regions have low resistance, extend in a direction of small piezo-resistive coefficients, and extend beyond the edge of the diaphragm so the electrodes contact the semiconductor body outside the diaphragm. The resistive strips 30, 31 are connected in a bridge. Deformation of the diaphragm causes the diffused resistor layers (i.e. the piezo-resistive strips) to expand or shrink so as to change their resistances. The pressure sensor senses a pressure change by electrically detecting the change of the resistances.

However, this pressure sensor is not very accurate in all circumstances, e.g. in case of temperature fluctuations, and in case of residual package-stress.

SUMMARY OF THE INVENTION

It is an object of the present invention to provide a good semiconductor pressure sensor.

In particular, it is an object of embodiments of the present invention to provide a pressure sensor with a good accuracy, in particular in case of a non-uniform temperature of the semiconductor substrate and/or in case of non-uniform packaging-stress and/or in case of a non-uniform electric field, or combinations thereof.

It is an advantage of embodiments of the present invention that good accuracy, e.g. improved accuracy is provided, even in the presence of a non-uniform temperature and/or a non-uniform stress and/or a non-uniform electric field, and even when said temperature, stress or field varies over time.

It is an object of particular embodiments of the present invention to provide a semiconductor pressure sensor with an improved zero-offset compensation.

These objectives are accomplished by a device according to embodiments of the present invention.

In a first aspect, the present invention provides a semiconductor pressure sensor for measuring an external pressure exerted on the sensor, comprising: a membrane as part of a semiconductor substrate for being deformed due to the external pressure, the membrane having a membrane edge and a membrane thickness; a first bridge circuit comprising a first resistor pair located on or adjacent to a first side portion of the membrane, and a second resistor pair located on or adjacent to a second side portion of the membrane; the first resistor pair comprising a first resistor connected between a first bias node and a first output node, and a second resistor connected between the first output node and a second bias node; the second resistor pair comprising a third resistor connected between the first bias node and a second output node, and a fourth resistor connected between the second output node and the second bias node; at least one of the first and second and third and fourth resistor comprising one or more elongated piezo-resistive strips arranged for measuring deformation of the membrane due to the external pressure to be measured; wherein the ratio of a largest distance between a point of the first resistor and a point of the second resistor, and a largest dimension of the membrane is less than 50%; and wherein the ratio of a largest distance between a point of the third resistor and a point of the fourth resistor, and a largest dimension of the membrane is less than 50%.

With "external pressure" is meant e.g. air pressure or gas pressure of the environment wherein the pressure sensor is located, in contrast to "internal pressure" e.g. caused by the packaging.

By providing the first and second resistor on or adjacent to the same side portion, whereby the ratio of a largest distance between a point of the first resistor and a point of the second resistor, and a largest dimension of the membrane (e.g. the width of a square membrane, or the diameter of a circular membrane) is less than 50%, or even less than 25%, meaning in fact that the resistors R1 and R2 are located "closely together" relative to the dimensions of the membrane, the temperature of these resistors is substantially the same, and hence the ratio of the resistance values R1/R2 of the first and second resistor is substantially insensitive to temperature variations (over time) at the first side portion, and to temperature differences between the first side portion and any other location of the membrane. Likewise, the ratio of the resistance values R3/R4 is substantially insensitive to temperature variations (over time) at the second side portion, and to temperature differences between the second side portion and any other location of the membrane, in particular the first side portion. Thus, by arranging the resistors as indicated, the accuracy of the bridge is relatively insensitive (or at least has a reduced sensitivity) to a temperature gradient over the sensor chip, in particular over the membrane.

Since at least one of the first, second, third and fourth resistors has one or more piezo-resistive element, e.g. one or more piezo-resistive strips, deformation of the membrane caused by external pressure will cause imbalance of the bridge circuit, and thus the external pressure applied to the membrane can be measured over the output nodes of the bridge, in a way which is insensitive to a temperature gradient over the membrane. As far as known to the inventors, compensating for temperature differences (e.g. a temperature gradient) over the membrane is not known in the art. The existence of such a temperature gradient and its impact on the accuracy of the sensor, is probably not even recognized in the field.

The output signal of the bridge, which can be measured over the output nodes, is representative for the deformation of the membrane, and hence for the external pressure.

By locating the resistors of each pair on the same side portion, and "relatively close" together, the influence of a temperature gradient which may exist over the membrane is strongly reduced, or even canceled. In other words, the zero-offset due to a temperature gradient over the membrane, is reduced or canceled.

In particular embodiments, the piezo-resistive strips of the first bridge are completely located on the membrane, although that is not absolutely required. In fact, simulations have shown that maximum sensitivity of the sensor can be obtained by partially locating the piezo-resistive strips on the bulk material.

Piezo-resistive strips can be fabricated on silicon devices in known ways, in particular by orienting the strips in a particular way with respect to the crystal lattice.

In an embodiment, at least two of the first, second, third and fourth resistors comprise one or more elongated piezo-resistive strips arranged for measuring deformation of the membrane due to the external pressure to be measured; and whereby the piezo-resistive strips are oriented such as to cooperate to the imbalance of the bridge when a pressure is exerted on the membrane.

It is an advantage of using at least two piezo-resistive strips, whereby the strips are oriented such that the individual influences of each piezo-resistive element are accumulated in the output voltage. Using more than one piezo-resistor increases the sensitivity and the accuracy of the pressure measurement.

This requires however that the resistors are oriented in such a way that they cooperate to the imbalance of the bridge. For example, if (referring to the arrangement of FIG. 4) only R1 and R2 would be piezo-resistive, their piezo-resistive strips need to be oriented substantially orthogonal, so that (for p type silicon strips) an increase of R1 due to pressure is accompanied by a decrease of R2 due to that same pressure. As another example, if only R1 and R3 would be piezo-resistive, and R1 and R3 are arranged on adjacent sides of a square membrane, their piezo-resistive strips would need to be oriented substantially parallel. However, if only R1 and R3 would be piezo-resistive, and R1 and R3 are arranged on opposite sides of a square membrane, their piezo-resistive strips would need to be oriented orthogonally.

In an embodiment, at least three of the first, second, third and fourth resistors comprise one or more elongated piezo-resistive strips arranged for measuring deformation of the membrane due to the external pressure to be measured; and whereby the piezo-resistive strips are oriented such as to cooperate to the imbalance of the bridge when a pressure is exerted on the membrane.

Using at least three piezo-resistive strips increases the sensitivity and the accuracy of the pressure measurement even more.

In an embodiment, each of the first, second, third and fourth resistors comprises one or more elongated piezo-resistive strips arranged for measuring deformation of the membrane due to the external pressure to be measured; and whereby the piezo-resistive strips are oriented such as to cooperate to the imbalance of the bridge when a pressure is exerted on the membrane.

Referring to the arrangement of FIG. 4, the piezo-resistive strips of the first, second, third and fourth resistor are chosen such that, when an external pressure is applied to the membrane, deformation of the membrane would cause the first and third resistance values to increase, while decreasing the second and fourth resistance values, or vice versa, thus the bridge imbalance R1/R2 versus R3/R4 would be maximized, and thus the sensor sensitivity increased.

In an embodiment, the at least one resistor comprising one or more elongated piezo-resistive strips, comprises at least two or at least three piezo-resistive strips connected in series.

By providing at least two or at least three piezo-resistive strips connected in series, the resistance value can be increased without having to decrease the doping level. In the case where each of the resistors has at least one piezo-resistive strip, each of the resistors preferably has at least two or at least three such strips connected in series. This is especially important when dimensions of the chip become smaller due to technology scaling. The piezo-resistive strips of each individual resistor are substantially oriented in parallel.

In an embodiment, the second side portion is located substantially or precisely at 90° angular distance from the first side portion, as measured from a center of the membrane.

It is an advantage of embodiments of the present invention where the second side portion is located substantially or precisely at 90° with respect to the first side portion, (e.g. in case of a square membrane this means that the first pair and the second pair are located on adjacent sides), because such a structure has a reduced sensitivity to the influence of a uniform stress, e.g. a stress parallel to the substrate. By this configuration a uniform stress across the membrane causes a common mode voltage shift of the output nodes and not an additional differential signal.

In an embodiment, the ratio of a largest distance between a point of the first resistor and a point of the second resistor, and a largest dimension of the membrane is less than 25%; and the ratio of a largest distance between a point of the third resistor and a point of the fourth resistor, and a largest dimension of the membrane is less than 25%.

It is an advantage of embodiments of the present invention that the piezo-resistive strips of the first and second resistor are located "relatively close to each other". The reason for defining "close" by means of said ratio is to unambiguously define what is meant by "relatively close".

The smaller the distance between the piezo-resistive strips, the smaller their temperature difference will be, such that it can be assumed that the temperature of all strips within one branch of the bridge is substantially the same, even if there is a temperature difference between the branches.

In an embodiment, the membrane is substantially square, and the largest dimension is the width of the square, the first side portion is a first side of the square, and the second side portion is a second side of the square adjacent the first side; and the first resistor and the second resistor are arranged substantially in the middle of the first side of the square; the third resistor and the fourth resistor are arranged substantially in the middle of the second side of the square.

In this embodiment, the pressure sensor has a membrane with a square shape. When a pressure is exerted on the square membrane, the deformation is larger in the middle of the sides than near the corners, and larger on the sides than in the center of the membrane, thus by providing the resistors substantially in the middle of the sides, the sensitivity of the pressure sensor is increased, e.g. maximized.

At the middle of the sides, and in a direction perpendicular to the membrane edge, stress due to the pressure exerted on the membrane is typically about 50% of this maximum value at a distance of about 2 times (2×) the membrane thickness. Therefore the first, second, third and fourth resistor are preferably completely located within a distance of 3 times (≤3×) the membrane thickness from the membrane edge, although (in principle) it is sufficient that at least one of the piezo-resistive strips of said resistors is located within that distance.

In an embodiment, the membrane is substantially circular, and the largest dimension is the diameter of the circle; or the membrane is substantially rectangular, and the largest dimension is the larger of the length and the width of the rectangle; or the membrane is substantially elliptical, and the largest dimension is the larger of the first and the second axis of the ellipse.

These are several examples of membrane shapes, whereby an appropriate dimension of the membrane is specified, however the invention is not limited to these examples, and membranes having other shapes may also be used, such as e.g. triangular shape, etc.

In an embodiment, the ratio of the resistance of the first resistor and the resistance of the second resistor lies in the range of 50% to 200%; and the ratio of the resistance of the third resistor and the resistance of the fourth resistor lies in the range of 50% to 200%, when no external stress is applied.

With resistance is meant "electrical resistance".

It is an advantage to choose the first resistance value approximately equal to the second resistance value, because then the voltage at the output nodes would be about 50% of the bias voltage applied to the bridge, allowing maximum zero offset in either positive or negative direction. At the same time, the risk for clipping the output signal to the supply voltage or to ground, is reduced.

In an embodiment, the second side portion is located at 90° angular distance from the first side portion as measured from a center of the membrane, and the elongated piezo-resistive strips of the first resistor are oriented orthogonal to the elongated piezo-resistive strips of the second resistor; and the elongated piezo-resistive strips of the third resistor are oriented orthogonal to the elongated piezo-resistive strips of the fourth resistor; and the elongated piezo-resistive strips of the first resistor are oriented parallel to the elongated piezo-resistive strips of the third resistor.

This is a particularly interesting arrangement (when using only a single bridge), which has a reduced sensitivity to temperature gradient over the membrane, but in additional has a reduced sensitivity to uniform package stress.

In another embodiment, the second side portion is located at 180° angular distance from the first side portion as measured from a center of the membrane, and the elongated piezo-resistive strips of the first resistor are oriented orthogonal to the elongated piezo-resistive strips of the second resistor; and the elongated piezo-resistive strips of the third resistor are oriented orthogonal to the elongated piezo-resistive strips of the fourth resistor; and the elongated piezo-resistive strips of the first resistor are oriented orthogonal to the elongated piezo-resistive strips of the third resistor.

This is another particularly interesting arrangement (when using only a single bridge), which has a reduced sensitivity to temperature gradient over the membrane, but unfortunately is still sensitive to uniform package stress.

In an embodiment, the semiconductor pressure sensor further comprises a second bridge circuit comprising a third resistor pair arranged at the first side portion of the membrane but outside of the membrane, and a fourth resistor pair arranged at the second side portion of the membrane but outside of the membrane; the third resistor pair comprising a fifth resistor connected between the first bias node and a third output node, and a sixth resistor connected between the third output node and the second bias node; the fourth resistor pair comprising a seventh resistor connected between the first bias node and a fourth output node, and an eighth resistor connected between the fourth output node and the second bias node; at least one of the fifth and sixth and seventh and eighth resistor comprising one or more elongated piezo-resistive strips arranged at a distance from the membrane edge of at least 4 times (≥4×) the membrane thickness for only measuring stress exerted by packaging on the semiconductor substrate (and not the pressure exerted on the membrane); circuitry for compensating the value measured by the first bridge using the value measured by the second bridge.

By locating the third and fourth resistor pairs on the substrate outside the membrane, at a distance from the membrane edge of at least 4 times (≥4×) the membrane thickness, e.g. at least 8 times (≥8×) the membrane thickness, these strips are only sensitive to package stress, but not to deformation of the membrane due to the external pressure, in contrast to the first and second resistor pairs, being mainly located on the membrane, within a distance of at most 3 times (≤3×) the membrane thickness, which are sensitive to both package stress and the external pressure to be measured.

By combining, e.g. subtracting the signals from the first and second bridge, the package stress can be compensated for, or the influence thereof can at least be reduced in the final stress measurement value.

Thus, a semiconductor pressure is provided with a reduced sensitivity to common mode temperature, e.g. ambient temperature (due to the first bridge), and to temperature gradients (due to using resistor pairs arranged "closely together"), and to common mode package stress (due to the resistor pairs of the second bridge, outside of the membrane), and optionally also to uniform package stress (e.g. exerted in a direction parallel to the substrate, if the resistor pairs are arranged at about 90° angular distance).

In an embodiment, each of the fifth and sixth and seventh and eighth resistor comprise one or more elongated piezo-resistive strips arranged for measuring the stress caused by packaging on the semiconductor substrate.

As for the first and second resistor pair, a larger signal is obtained when each of the fifth to eighth resistor comprises piezo-resistive strips, resulting in a more accurate signal.

In an embodiment, the elongated piezo-resistive strips of the fifth resistor and of the sixth resistor are oriented in orthogonal directions, and the elongated piezo-resistive strips of the fifth resistor are parallel or orthogonal to the elongated piezo-resistive strips of the first resistor, and the elongated piezo-resistive strips of the seventh resistor and of the eighth resistor are oriented in orthogonal directions, and the elongated piezo-resistive strips of the fifth resistor are parallel or orthogonal to the elongated piezo-resistive strips of the first resistor.

By using four piezo-resistive resistors, and arranging them in this manner, the imbalance of the bridge is increased (e.g. maximized), and hence the sensitivity of the sensor is increased, e.g. optimized.

In an embodiment, the elongated piezo-resistive strips of each of the fifth, sixth, seventh and eighth resistor have the same dimensions as the elongated piezo-resistive strips of the first, second, third and fourth resistor respectively.

This has the advantage that the behaviour of the first and of the second bridge is better matched.

In an embodiment, each of the first, second, third, fourth, fifth, sixth, seventh and eighth resistor have the same number of piezo-resistive strips, and the dimensions of all these piezo-resistive strips are identical.

This has the advantage that the behaviour of the first and of the second bridge is optimally matched. Preferably in this case the layout of the resistor pairs is as much as possible identical (apart from rotation, translation, mirroring, and/or scaling). It was surprisingly found that by doing so, there is a very good correlation between the zero-offset of the first (inner) bridge and the zero-offset of the second (outer) bridge, so that the compensation of the first bridge can be much improved (at least a factor of 2).

In a particular embodiment, the second side portion is located at 90° angular distance from the first side portion as measured from a center of the membrane, and the elongated piezo-resistive strips of the first resistor are oriented orthogonal to the elongated piezo-resistive strips of the sixth resistor; and the elongated piezo-resistive strips of the seventh resistor are oriented orthogonal to the elongated piezo-resistive strips of the eighth resistor; and the elongated piezo-resistive strips of the fifth resistor are oriented parallel to the elongated piezo-resistive strips of the seventh resistor, and the elongated piezo-resistive strips of the fifth resistor are oriented parallel to the elongated piezo-resistive strips of the first resistor.

This is a particularly interesting arrangement (when using a double bridge), which has a reduced sensitivity to temperature gradient over the membrane, but in additional has a reduced sensitivity to uniform package stress, and has an improved zero-offset correction of the first bridge, thanks to the matching of the piezo-resistors, especially if the layout of the resistors is the "same" (apart from rotation, translation, and mirroring).

In another particular embodiment, the second side portion is located at 180° angular distance from the first side portion as measured from a center of the membrane, and the elongated piezo-resistive strips of the fifth resistor are oriented orthogonal to the elongated piezo-resistive strips of the sixth resistor; and the elongated piezo-resistive strips of the seventh resistor are oriented orthogonal to the elongated piezo-resistive strips of the eighth resistor and the elongated piezo-resistive strips of the fifth resistor are oriented orthogonal to the elongated piezo-resistive strips of the seventh resistor; and the elongated piezo-resistive strips of the fifth resistor are oriented parallel to the elongated piezo-resistive strips of the first resistor.

This is another particularly interesting arrangement (when using a double bridge).

In embodiments, the semiconductor pressure sensor is arranged on a CMOS wafer, whereby the membrane is located in an (100) plane, and at least one of the piezo-resistive elements is oriented in the <110> direction.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 13 shows a variant of the embodiment of the pressure sensor of FIG. 11, using the layout pattern of FIG. 8 (or part thereof) instead of the pattern of FIG. 5.

FIG. 14 shows an schematic example of radial stress (e.g. caused by pressure) at four locations of the membrane, which stress is typically caused by a pressure exerted on the membrane in a direction perpendicular to the substrate.

FIG. 15 shows an schematic example of uniform stress (in this case from left to right) at four locations of the membrane, which stress may be caused by packaging.

Figure 1:
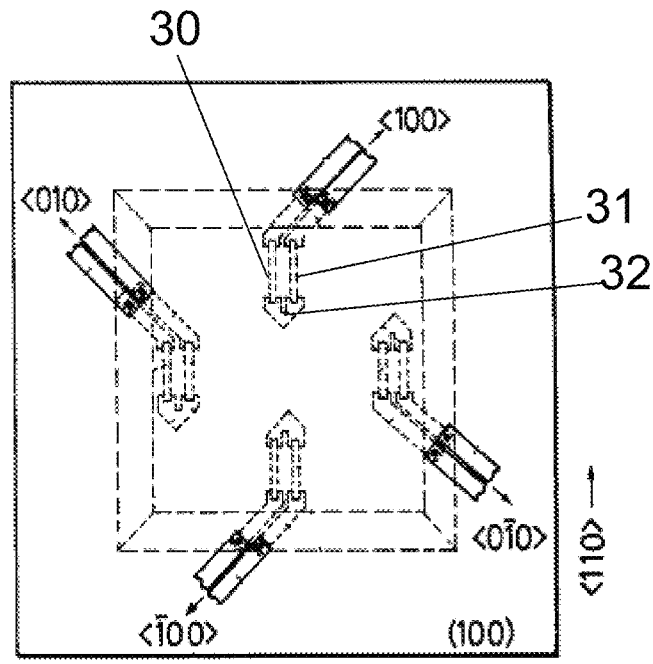
FIG. 1 shows a semiconductor pressure sensor, known in the art.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the present invention, the terms "diaphragm" and "membrane" are used as synonyms for indicating a region of a semiconductor substrate with a reduced thickness as compared to the surrounding substrate material (called "bulk"), adapted to mechanically deform when a pressure to be measured is applied thereto.

When in the present invention, reference is made to "largest dimension of the membrane" or simply "dimension of the membrane", reference is made to the length of a side in case the membrane has a substantially square shape, or to the distance between opposite sides in case the membrane has a square shape with rounded corners, or to the diameter in case the membrane is substantially circular, or the length of the largest axis in case the membrane is substantially elliptical, or to the larger of the length and the width in case the membrane is substantially rectangular, or to the diameter of the inner circle in case the membrane has a regular polygonal shape, such as e.g. a hexagonal or octagonal shape.

The term "thickness of the membrane" has its usual meaning, as can be measured in a direction perpendicular to the substrate.

While the circuit of U.S. Pat. No. 4,672,411 (Hitachi), described in the background section and illustrated in FIG. 1 has some drawbacks, many of the basic principles described therein are also used in the present invention. For example, the membrane edges of embodiments of the present invention are preferably realized in such a way that maximum stress caused by the applied pressure is reached in at least two areas perpendicular to the membrane edge and where the membrane edge is oriented in the <110> direction. Anisotropic etching of square membranes in silicon is often used as it creates four of such areas at the middle of the membrane edges due to the anisotropic etch stop on <111> planes. By using other etching methods round membranes would also result in four of such areas and oval membranes in two of such areas. The stress sensitivity of piezo-resistors also depends on the crystal orientation and the p doped resistors have a maximum change in resistance along the <110> directions, and a minimum change in resistance along the <100> directions, at 45° from the <110> directions. Metal connections cause stress in the silicon and due to creep this stress can also change over time. Therefore a highly doped p doped path is realized between the metal and the piezo-resistive strips. By placing these highly p doped paths in the <100> directions at 45 degrees of the <110> directions one assures that stress from the metal lines does not change the resistance of these strips.

In order to avoid unnecessary repetition of these basic concepts, the present application will not go into further details of crystallographic planes and directions, and will concentrate on the contribution of the present invention over the prior art. The reader may refer to U.S. Pat. No. 4,672,411 for more details. Although other crystallographic directions may also be used, it is assumed that the membrane of a pressure sensor according to the present invention is located in an (100) crystallographic plane of a CMOS wafer, and that the piezo-resistive strips are located in the <110> direction. Using CMOS wafers allows the combination of the pressure membrane and CMOS circuitry, e.g. at least readout-circuitry, to be integrated on the same wafer.

Figure 2:
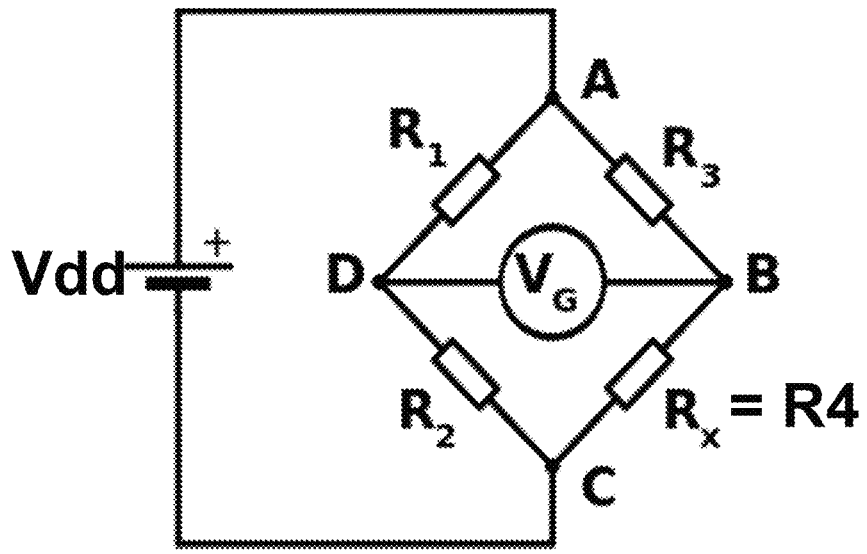
FIG. 2 shows a Wheatstone bridge configuration with two branches, each comprising two resistors, known in the art.

Before a pressure sensor according to embodiments of the present invention is described, first the principles of a Wheatstone-bridge circuit are explained. Wheatstone-bridge circuits with four resistors arranged as shown in FIG. 2, are well known in the art. Such circuits are very well suited for determining an unknown resistor value Rx, when three other resistor values R1, R2 and R3 are known, or for measuring small resistance changes when all four resistor values are known. The bridge of FIG. 2 has four resistors R1, R2, R3 and R4 (or Rx). When a supply voltage (e.g. a DC voltage) Vdd and Gnd are applied to the nodes A and C, respectively, a first current will flow from A to C through the first branch formed by R1 in series with R2, and a second current will flow through the second branch formed by R3 in series with R4. A differential voltage output "Vout" is provided over the nodes D and B, and defined as: Vout=Vd−Vb.

When the bridge is "in balance", the following formula applies:

$$R1/R2=R3/R4 \quad (1)$$

which is equivalent to:

$$R1\times R4=R2\times R3 \quad (2)$$

When the bridge is in balance, the voltage "Vd" at the node D between R1 and R2 will be exactly equal to the voltage "Vb" at the node B between R3 and R4, and no current will flow in a path between the nodes B and D (e.g. through a galvanometer, indicated by Vg). When one or more of the resistor values R1 to R4 deviate, even slightly, from this balance situation, the bridge is no longer in balance, and a voltage difference Vout will appear over the nodes D and B, which can be measured in any manner known in the art, e.g. typically by an amplifier having an amplification factor of about 100 or more. Such a bridge circuit is relatively insensitive to common mode temperature changes, i.e. when the temperature of all resistors R1 to R4 increases or decreases with a same amount, because not the absolute resistance values are important, but only their ratio, as can be understood from formula (1) above.

In an ideal pressure sensor, the voltage output over the nodes D and B should be exactly zero when no pressure difference, further simply referred to as "pressure", is applied to the membrane 2, and ideally this value remains exactly zero irrespective of the sensor temperature in absence of said pressure. In practice, however, this output voltage value Vg corresponding to zero-pressure, is not exactly zero, and needs to be compensated for, in order to achieve an accurate pressure measurement value. This non-zero value is called "zero-offset", i.e. the voltage offset value between nodes D and B when no external pressure is exerted on (or applied to) the sensor membrane. There are various reasons for such zero-offset, e.g. mismatch between the various resistance values due to imperfections of the semiconductor processing, residual stresses in the membrane due to packaging of the semiconductor (e.g. silicon) die, or an inhomogeneous electric field perpendicular to the substrate, which modifies the resistors not in the same way (depletion layer changes). While for discrete (thick film) resistors, a mismatch between the various resistance values due to semiconductor processing may be corrected by laser trimming at the production stage, laser trimming is not possible for piezo resistors that are part of a CMOS circuit. In addition, also several other effects, such as e.g. stress due to packaging and temperature gradient remain.

Figure 3:
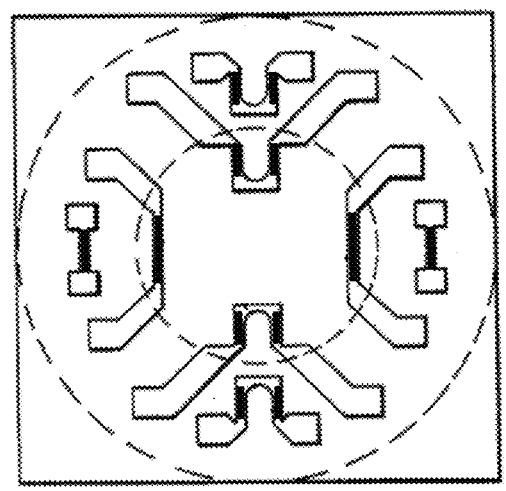
FIG. 3 shows another semiconductor pressure sensor, known in the art.

Various attempts have been made in the art for reducing the zero-offset. For example, FIG. 3 shows a prior art pressure sensor disclosed by Honeywell in EP0083496. It is to be noted that in the illustration in the present document black lines are added to FIG. 3, to clearly indicate the position and orientation of the piezo-resistive strips, for reasons that will become clear later. This sensor has a first bridge with resistors located on the membrane for measuring the pressure exerted on the membrane. This first bridge has a zero-offset due to temperature variations and due to package stress. This offset is reduced by using a second bridge, having four resistors located outside the membrane. This total double bridge sensor provides a pressure value that is compensated for package stress, however, the compensation is not perfect.

While the problem of compensating for package stress was addressed by Honeywell, as far as known to the inventors, no pressure sensor has been developed so far, that takes into account a temperature difference or temperature gradient over the substrate, in particular, over the membrane 2. Yet, the inventors found that a temperature difference as small as 0.1° C. of one of the resistors R1 to R4 would typically cause a 1% full scale error. This problem is probably not even recognized in the field. It is to be noted that this is a different problem from compensating against a varying temperature common for all resistors, which problem is inherently solved by using the bridge structure.

The inventors further realised that such a temperature difference (or temperature gradient) may be hard or even impossible to predict, because it may e.g. be caused by the power dissipated by several sub-circuits on the integrated pressure sensor, and it may even be firmware dependent (e.g. when the sensor is part of an integrated chip with a processor that activates or deactivates certain sub-circuits, or changes their clock frequencies). But temperature gradients on the semiconductor, e.g. silicon, die may also be caused by the environment, e.g. when the pressure sensor is exposed to a non-homogeneous and/or time-dependent heat flow.

After realizing the presence of a temperature gradient on the membrane, a closer look at the prior art sensor of FIG. 1 revealed that the resistors are placed relatively far apart from each other at the different membrane edges (the distance between the resistors is approximately equal to 0.7× the membrane size). On top of the readout-signal (indicative for the external pressure to be measured), an error signal is produced in case a temperature gradient is present across the membrane. The resistors will be of different values due to these temperature differences. The error signal increases (e.g. about proportionally) with increasing temperature differences of the resistors, and the further the resistors are apart the larger these temperature differences will be. In a similar way an error signal is produced when the residual stress on the resistors (e.g. stress that is not caused by the external pressure to be measured) is not the same for all resistors, and may even change over time. Such stress can e.g. be caused by forces introduced by the packaging of the sensor. This change in stress can e.g. be caused by plastic deformation of the glue that bonds the sensor to a surface, plastic deformation of the surface and/or plastic deformation of the protection gel that is often applied. A third source of error can be caused by a non-uniform external electric field which is not the same for the individual resistors, and again, the further the resistors are spaced apart, the more their resistance values will differ. Such an electrical field changes the value of a diffused resistor e.g. as it modifies the insulating depletion layer. Possible sources can be emission of electric fields from external components near the chip, electronics that are integrated on chip or from charge trapped in the material above the piezo resistors. In addition, two or more of these phenomena (temperature, package stress, electric field) may occur simultaneously.

Figure 4:
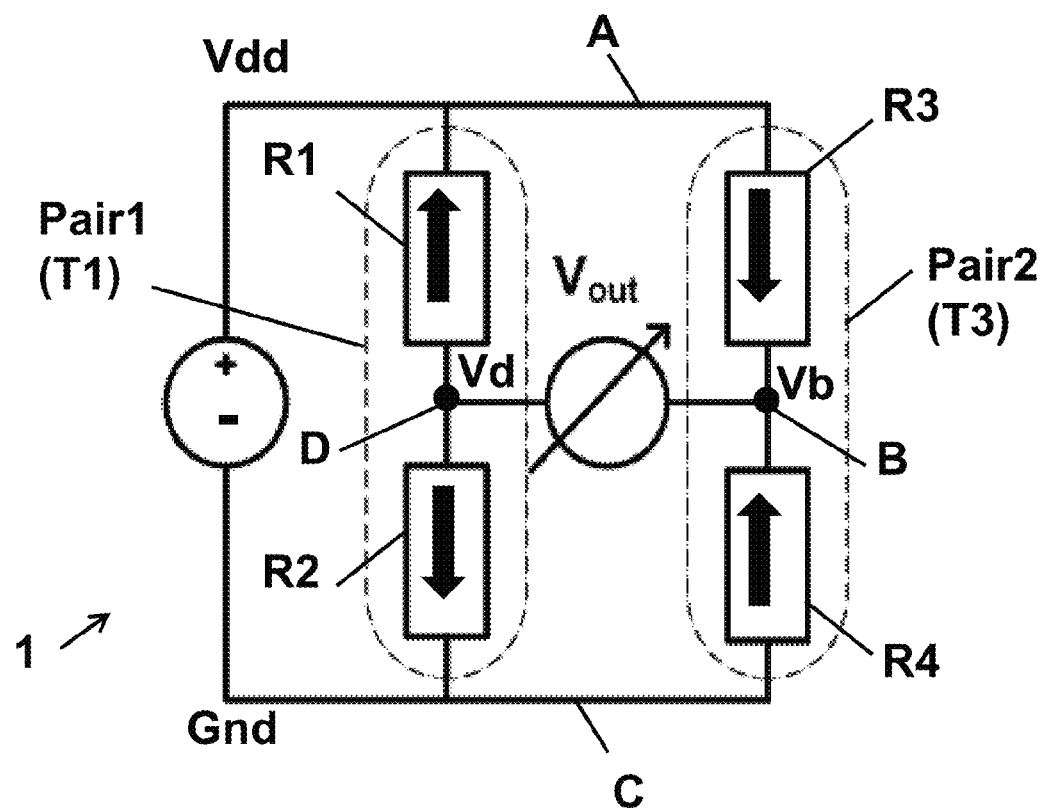
FIG. 4 shows the Wheatstone bridge of FIG. 2, with additional indications of certain aspects relevant for the present invention.

Looking for a solution to reduce the inaccuracy caused by a temperature gradient, the inventors came to the technical insight that the four resistors R1 to R4 of the Wheatstone bridge of FIG. 2, in fact, need not all have the same temperature for the bridge to be (or remain) in equilibrium, but it suffices that the temperature of the resistors R1 and R2 of the first branch are (substantially) the same, and that the temperature of the resistors R3 and R4 of the second branch are (substantially) the same, as indicated by "Pair1(T1)" and "Pair2(T3) in FIG. 4. In mathematical notation, if Ti represents the temperature of the resistor Ri, for i=1 to 4, then, in order for the bridge to be (or remain) in equilibrium, it suffices that T1=T2, and T3=T4, but T1 may be substantially different from T3. In practice, of course, T1 will not be exactly equal to T2, and T3 will not be exactly equal to D4, but what is important is that the temperature difference |T1−T2| in absolute value is smaller than the temperature difference |T1−T3| in absolute value, preferably at least by a factor of 2, more preferably at least by a factor of 5. For the sake of the discussion however, we will assume that T1=T2 and that T1 is different from T3. As an example, if the resistance values of R1 and R2 both increase with e.g. 2% above their nominal value, (e.g. because T1 and T2 both increase with 2° C.) the ratio R1/R2 remains unchanged, and hence also the voltage Vd at node D remains unchanged. If at the same time the resistance values of R3 and R4 increase with e.g. 4% above their nominal value (e.g. because T3 and T4 both increase with 4° C.), the ratio R3/R4 remains unchanged, hence the voltage Vb at node B remains unchanged, and thus the bridge remains in balance despite the temperature difference between T1 and T3. This insight is one of the underlying ideas of the present invention.

The same is true when the bridge is not entirely in equilibrium, i.e. when Vout < >0. The following formulas are applicable when the bridge is not in balance:

$$Vout/Vdd = R2/(R2+R1) - R4/(R3+R4) \quad (3), \text{ or}$$

$$Vout/Vdd = 1/(1+R1/R2) - 1/(1+R3/R4) \quad (4)$$

From equation (4) it can be seen that only the matching within each pair matters and that not all resistors need to be matched. This insight is exploited in the present invention by placing the two resistors R1 and R2 "close" to each other (compared to the width W of the membrane 2), such that the temperature difference T1 and T2 thereof, in the presence of a temperature gradient over the membrane 2, is reduced w.r.t. prior art embodiments. Indeed, the effect of a temperature gradient is typically proportional to the distance between the resistors. In the prior art (e.g. FIG. 1 and FIG. 3), the distance between the resistors is about ½√2 or about 0.7 times the membrane length (or diameter) whereas for the resistor pairs of the present invention this distance is chosen smaller, e.g. smaller than 0.50 times the membrane length or diameter, e.g. less than 0.35 times the membrane length or diameter, e.g. less than 0.20 times the membrane length or diameter, or e.g. even less than 0.10 times the membrane length or diameter. Hence the difference in temperature |T1−T2| is reduced by about a factor 2 (in case of 0.35) or about one order of magnitude (in case of 0.10). Likewise, the resistors R3 and R4 are located "closely" together. In order to avoid the relative term "close", a more exact definition of what is meant by "close", will be given in relation to FIG. 6.

At the same time, the two pairs themselves need not be located closely together, but are preferably located at locations on the membrane with a high sensitivity (e.g. near the middle of the side of a square membrane). It is advantageous to locate the resistor pairs apart (e.g. on different edges) rather than locating all four resistors together, because in that way the two resistors of each pair can be located closer to those locations on the membrane with a higher sensitivity (e.g in case of a square membrane, the middle of opposite sides). Even more importantly, by not locating the four resistors together, it is possible to distinguish between stress caused by the pressure (to be measured) and stress caused by the package.

A second (optional) idea underlying embodiments of the present invention having at least two piezo-resistive elements, in particular only two or only three or four piezo-resistive elements, is to orient those piezo-resistive elements, e.g. piezo-resistive strips, in such a way that they "cooperate" to the imbalance of the bridge. when their value changes due to pressure. Several examples are described next.

In a first example, R1 and R2 are piezo-resistive, while R3 and R4 are not. By properly orienting R1 and R2, an external pressure applied to the membrane would increase the value of R1 while at the same time decreasing the value of R2, or vice versa. This has the effect that the value of Vd at node D changes in the same direction (e.g. decreases) by both the change of R1 and the change of R2, while the value of Vb at node B would remain unchanged due to said pressure. Hence, by their orientation, the resistors R1 and R2 "cooperate" to the imbalance of the bridge. As a second example, if R1 and R3 are piezo-resistive, then R1 and R3 should be oriented in such a way that when R1 increases with pressure, R3 decreases, otherwise Vd and Vb would both change in the same direction, and hence Vout would remain unchanged. As a third example, in case R1 and R4 are piezo-resistive, R1 and R4 should be oriented in such a way that when R1 increases with pressure, that R4 also increases, hence Vd at node D would decrease while Vb at node B would increase, hence Vout changes. As a fourth example, in case R2 and R4 are piezo-resistive, R2 and R4 should be oriented in such a way that when R2 decreases (hence Vd decreases), R4 increases (hence Vb increases). As a fifth example, in case all resistors R1 to R4 are piezo-resistive, then they should be oriented in such a way that when R1 increases, then R2 should decrease, R3 should decrease and R4 should increase. The skilled person can easily derive other possible combinations in case of two or three piezo-resistive elements, by looking at the arrows in FIG. 4, either pointing up (e.g. increasing with pressure) or down (e.g. decreasing with pressure), but the arrows could also have been inverted. As will be described further, it depends on which edge of the membrane 2 the resistors R1, R2, R3, R4 are located, for deciding whether they should be oriented substantially in parallel or substantially orthogonal.

As explained above, although preferred for maximum sensitivity, it is not absolutely required that all four resistors R1 to R4 have one or more piezo-resistive elements 8, 9. Indeed, the invention would also work if only one of the resistors, e.g. only R1, had a piezo-resistive element sensitive to the pressure exerted on the membrane 2. In that case the ratio R1(T1,p)/R2(T2) would be sensitive to pressure but (substantially) insensitive to a temperature gradient (provided that T1≈T2), while the ratio R3(T3)/R4(T4) would be (substantially) insensitive to both pressure "p" and temperature gradient (provided that T3≈T4). The sensitivity of such a sensor would be approximately four times smaller than the pressure sensor wherein each of the resistors R1 to R4 have piezo-resistive elements.

A third aspect underlying the present invention is the "insight" that pressure on the membrane is not the only cause for stress in the piezo-resistors. Such additional stress may have the same effect as an applied pressure, oriented in a direction perpendicular to the membrane surface (resulting in a radially directed stress), but additional stress can also be oriented in a common direction for all resistors and substantially parallel to the substrate surface. Also this stress can be reduced by properly locating the resistors on the membrane, as will be described further.

Figure 5:
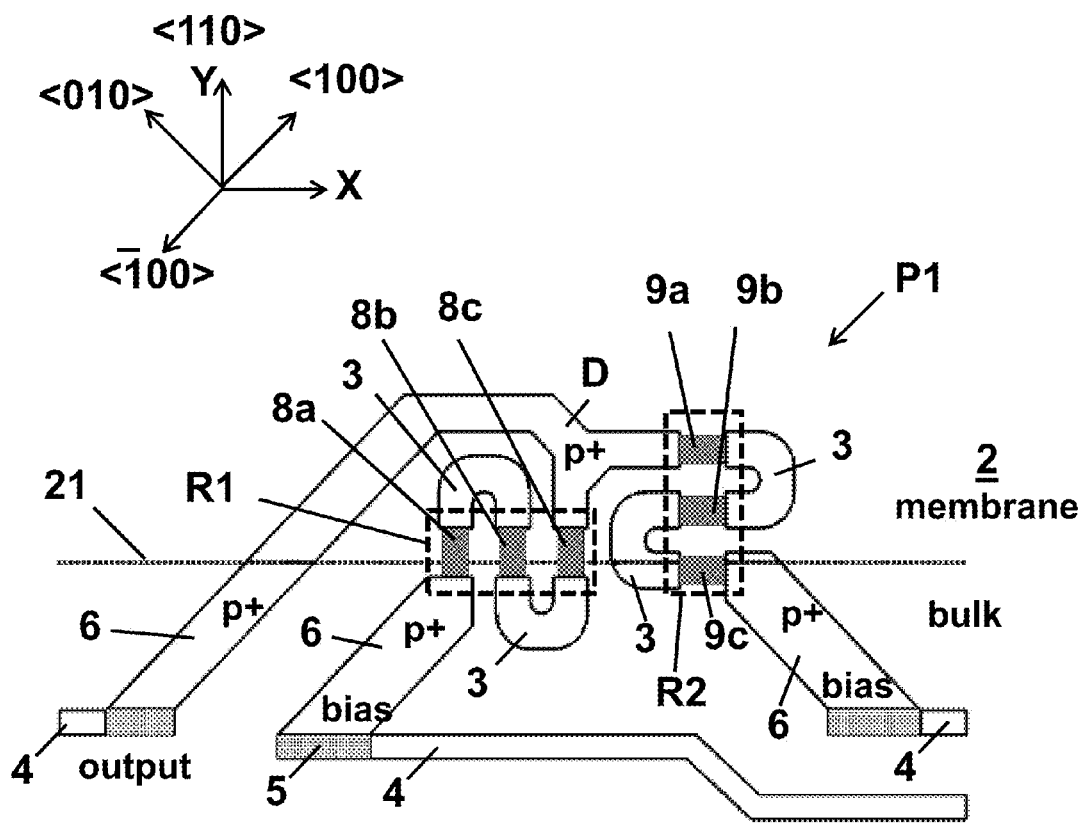
FIG. 5 shows a top view of an example of a layout pattern comprising a resistor pair, and lead-out portions, as can be used in a pressure sensor according to embodiments of the present invention. The resistor pair comprises piezo-resistive strips (dark gray) in close vicinity of the membrane edge.

FIG. 5 shows an embodiment of a possible pattern of a resistor pair P1 comprising a first resistor R1 and a second resistor R2, as can be used in a pressure sensor according to embodiments of the present invention.

In the example shown, the first resistor R1 comprises three elongated pressure sensitive semiconductor strips 8a, 8b, 8c connected in series, but more than three or less than three strips may also be used, for example only two strips. These strips 8a, 8b, 8c are made of semiconductor material doped with dopants of a first dopant type, e.g. p type silicon, and are oriented in a first direction Y, e.g. corresponding to a crystal lattice direction of relatively large, e.g. maximum piezo-resistive coefficients. For more information about the piezo-resistive coefficients, and their relation to the crystal lattice directions, the reader is referred to U.S. Pat. No. 4,672,411, in particular to FIG. 9 thereof, and the corresponding part of the description.

The second resistor R2 comprises three elongated pressure sensitive semiconductor strips 9a, 9b, 9c connected in series, but more than three or less than three strips may also be used. These strips 9a, 9b, 9c are made of semiconductor material doped with dopants of the first dopant type, e.g. p type silicon, and are oriented in a second direction X, substantially orthogonal to the first direction Y, also corresponding to a crystal lattice direction of relatively large, e.g. maximum piezo-resistive coefficients.

Due to the orthogonal orientation of the (elongated) strips 8a, 8b, 8c of the first resistor R1 and the (elongated) strips 9a, 9b, 9c of the second resistor R2, an increase of the stress of the strips 8a, 8b, 8c due to strain in a direction parallel to the current, would entail a similar stress perpendicular to the direction of the current of the strips 9 of the second resistor R2. Thus pressure on the membrane 2 causing an increase in the electrical resistance of the first resistor R1 would at the same time cause a decrease of the electrical resistance of the second resistor R2, and vice versa. If fact, this is only true for p type resistors. While causing a bridge imbalance, this also has as an effect that the current through the bridge is fairly independent of pressure, because the total resistance of each branch, e.g. (R1+R2) does not change 'much' with pressure, or more exactly phrased, the change of the sum (R1+R2), denoted by $|\Delta(R1+R2)|$ is smaller in absolute value than the largest of the individual changes $|\Delta R1|$ and $|\Delta R2|$.

Electrode lead-out regions 6 are provided for applying bias voltages (e.g. Vdd and Gnd) over the series connection of the resistors R1 and R2, and for measuring the voltage of the intermediate node "D" between the resistors R1 and R2. These lead-out regions 6, as well as "corner parts" 3 interconnecting the piezo-resistive strips 8a, 8b, 8c and the strips 9a, 9b, 9c, are made of a heavily-doped layer of the first dopant type, for instance a heavily-doped p+ type diffused layer. They have a relatively low electrical resistance, and extend in a direction of relatively small piezo-resistive coefficients (in the example shown, preferably at angles of +/−45° with respect to the first and second direction Y, X). The lead-out regions 6 extend beyond the edge 21 of the membrane 2, and are in ohmic contact with conductor electrodes, e.g. metal electrodes 4, outside of the membrane 2. Such metal electrodes 4 may e.g. comprise aluminum. The reader may notice that the electrode lead-out region 6 connected to node D is not entirely oriented at angles of +/−45° with respect to the first and second direction Y, X, because in fact, that is not required for this lead, since there is substantially no current flowing through this lead. Indeed, the nodes D and B (only node D is shown in FIG. 5) are typically connected to inputs of an amplifier (not shown) for amplifying the output voltage Vout.

Since the diffused layers of the first dopant type, e.g. p type diffused layers, 8a, 8b, 8c, 9a, 9b, 9c constituting the pressure sensing elements have a relatively large, e.g. the maximum, piezo-resistive coefficient, their electrical resistance is varied greatly by a strain which develops due to the deformation of the semiconductor, e.g. silicon, membrane 2. That is, these pressure sensing elements are very sensitive to a pressure or the like. In contrast, since the diffused layers are heavily doped with dopants of the first dopant type, e.g. heavily-doped p+ diffused layers, the interconnections 3 and 6 are arranged in orientations of relatively small, e.g. minimum piezo-resistive coefficients, they are the least sensitive to a pressure change. By orienting the piezo-resistive strips 8a, 8b, 8c of the first resistor R1 close to and orthogonal to the piezo-resistive strips 9a, 9b, 9c of the second resistor R2, a pressure exerted on the membrane 2 will have an opposite effect on the electrical resistance of the first and second resistors R1, R2, in the sense that, when the resistance of the first resistor R1 increases due to pressure exerted thereon, the resistance of the second resistor R2 decreases, and vice versa, and thus the ratio R1/R2 of the bridge is substantially changed due to the strain, thereby strongly increasing the sensitivity of the circuit.

By locating the contacts between the conductive, e.g. metal, electrodes 4 and the lead out regions 6 of the first dopant type, e.g. p+ type lead out regions, largely outside the membrane 2, the influence which is exerted on the deformation of the semiconductor, e.g. silicon, membrane by the residual stress developing in the vicinity of the contact portion, and any temperature hysteresis, can be reduced, e.g. minimized.

Figure 7:
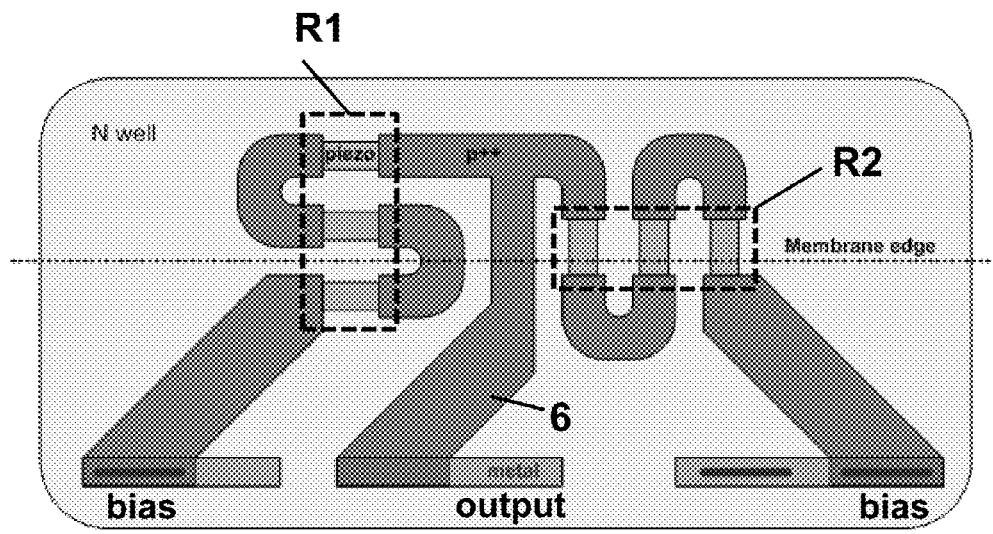
FIG. 7 shows a variant of the layout pattern of FIG. 5, whereby the lead-out region of the output node lies between the lead-out regions of the biasing nodes.
Figure 8:
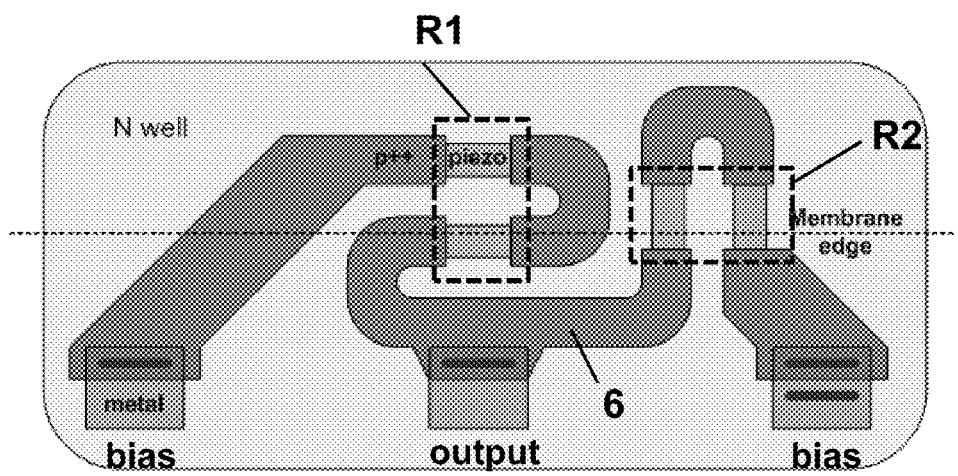
FIG. 8 is a variant of the layout pattern of FIG. 7, whereby each resistor has only two parallel piezo-resistive strips connected in series instead of three.

This aspect is even improved in the layouts shown in FIG. 7 and FIG. 8, where the lead out region 6 of the output node (in the middle of the structure) is not routed outside of the structure, but is located between the lead out regions of the biasing nodes. In the structure of FIG. 7 each resistor R1, R2 contains three piezo-resistive strips. In the embodiment of FIG. 8, each resistor contains only two piezo-resistive strips. But the invention is not limited to these particular layouts, and other variants may also be used, for example rotated, mirrored, scaled and/or stretched versions hereof, or variants having a first resistor R1 with three piezo-resistive strips and a second resistor R2 with only two piezo-resistive strips, or vice versa.

Referring back to FIG. 5, the electrical resistance of the first resistor R1, (approximately equal to as many times the electrical resistance of one piezo-resistive strip 8a, 8b, 8c as there are strips in this resistor R1, for instance in the embodiment illustrated three times in view of R1 comprising three piezo-resistive strips 8a, 8b, 8c), is preferably substantially the same as the electrical resistance of the second resistor R2, as is the electrical resistance of the third resistor R3 preferably substantially the same as the electrical resistance of the fourth resistor R4, because in that case the output voltages Vd and Vb, i.e. the voltage of the node D between the resistors R1 and R2, and of the node B between the resistors R3 and R4 would be substantially halfway between the bias voltages Vdd and Gnd, thus about 50% of the supply voltage Vdd. However, this is not absolutely required, and the invention would also work if the resistor values of R1 and R2 on the one hand, and R3 and R4 on the other hand, would be substantially different.

Figure 9:
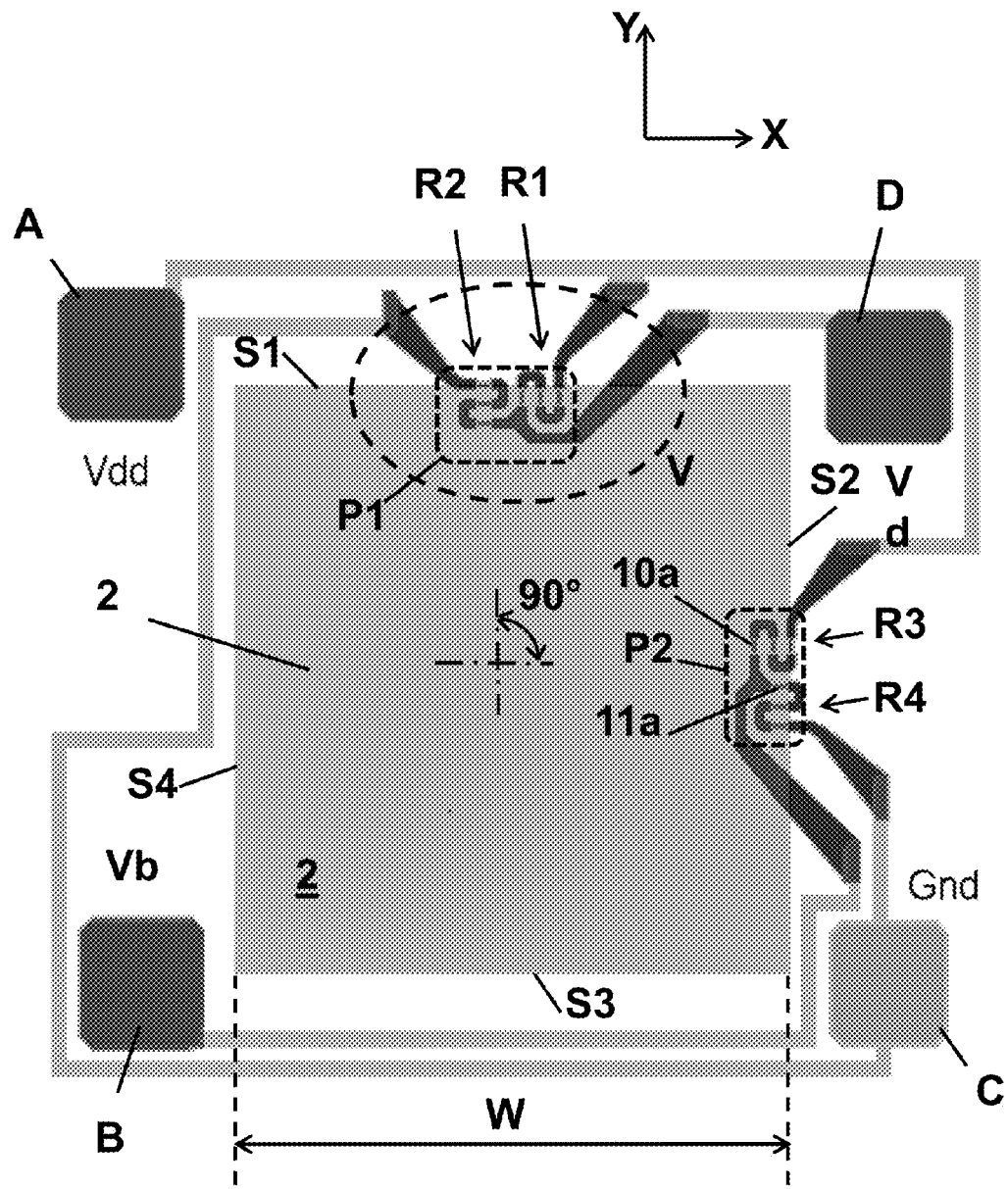
FIG. 9 shows part of a first embodiment of a pressure sensor according to embodiments of the present invention, having two resistor pairs using the layout pattern of FIG. 5 (or part thereof), located on adjacent sides of a square semiconductor membrane, the two resistor pairs being connected in a bridge.

FIG. 9 shows part of a first embodiment of a pressure sensor according to embodiments of the present invention, using two resistor pairs P1, P2 having a pattern as shown in FIG. 5, or translated, rotated, mirrored, scaled or stretched versions thereof. The pressure sensor of FIG. 9 has a membrane 2 with a square shape and four sides S1, S2, S3, S4 of width W, however the invention is not limited thereto, and would e.g. also work with a rectangular, elliptical, circular shape, or other suitable shapes. The sides S1 and S2 are adjacent sides, the sides S1 and S3 are opposite sides. The sensor further comprises a bridge circuit, having two branches between the nodes A and C. The nodes A and C may be biased by the voltages Vdd and Gnd, in any suitable way known in the art. The first branch comprises a first resistor pair P1 comprising the resistors R1 and R2 connected in series. The second branch comprises a second resistor pair P2 comprising the resistors R3 and R4 connected in series. The resistors R1 and R2 are located "close" to one another, substantially in the middle of the side S1, and are "close" to the edge of the membrane 2. The resistors R3 and R4 are located "close" to each other, substantially in the middle of the second side S2, and "close" to the edge of the membrane 2.

Figure 6:
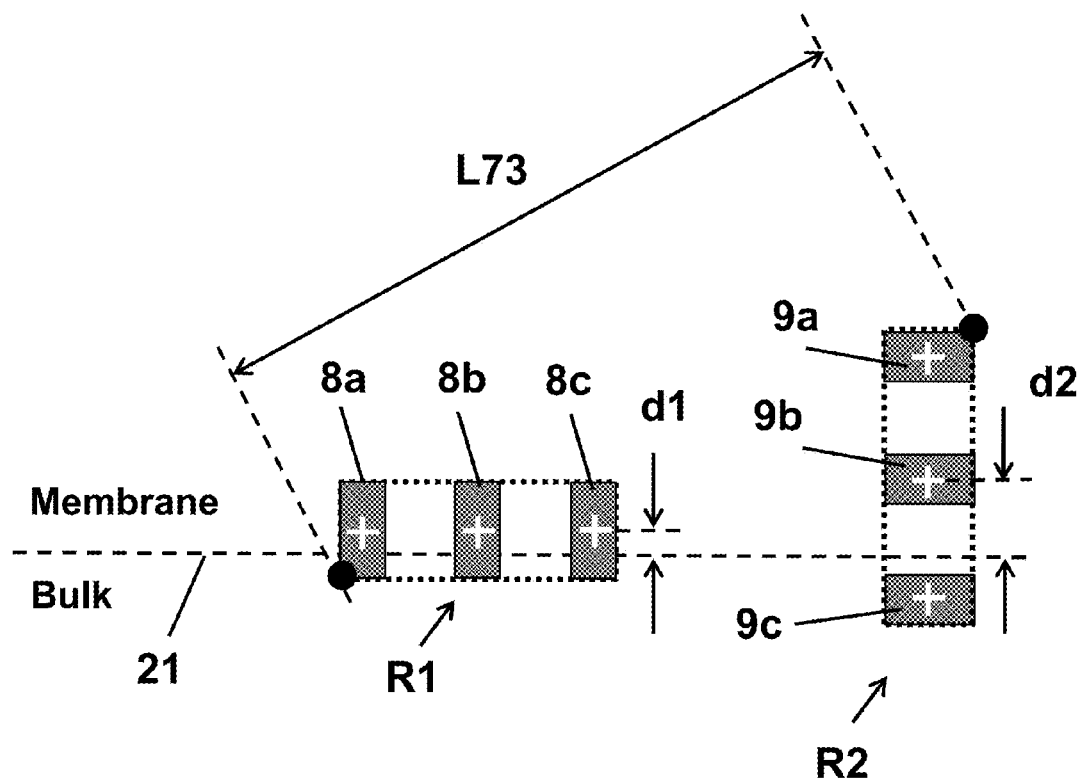
FIG. 6 shows an enlarged view of the piezo-resistive strips of FIG. 5, with an indication of "the largest distance between a point of the first resistor and a point of the second resistor".

In order to quantify that the resistors R1 and R2 of the first pair P1 are located "close" to each other (as compared to the size of the membrane 2), a maximum distance L73 defined between a point of the first resistor R1 and a point of the second resistor R2, in particular defined by a point of the piezo-resistive strips 8a and a point of the piezo-resistive strip 9a of the resistors R1 and R2 is determined, as illustrated in FIG. 6, where said points are indicated by black dots for illustrative purposes. In preferred embodiments of the present invention, the ratio of said maximum distance L73 and a dimension of the membrane 2 (in case of a square membrane said dimension would be chosen to be the width W of the membrane), i.e. L73/W is less than 50%, preferably less than 40%, preferably less than 35%, preferably less than 30%, preferably less than 25%, preferably less than 20%, preferably less than 15%, such as e.g. about 10%. In case the membrane 2 has a circular shape, the ratio would be calculated as the length of said maximum distance L73 over the diameter of the circle. In case the membrane has an elliptical shape, the ratio would be calculated as the maximum distance L73 over the larger of the two axes of the ellipse. In case the membrane 2 has a substantially octagonal shape, the ratio would be calculated as the length of said diagonal L73 over the distance between opposite sides of the octagonal, etc.

Although not shown in FIG. 5 or FIG. 6, but visible in FIG. 9 to FIG. 13 and FIG. 16, the resistors R1, R2, R3, R4 are preferably located about in the middle of the sides of the membrane 2, because for a square membrane shape, this is where pressure causes maximum tensile stress. In case of a circular or elliptical membrane, there are no "sides", but the resistors are preferably located near the edge of the membrane, and substantially 90° or 180° apart as seen from the membrane centre, and in a suitable crystallographic position and orientation, in particular, in case of a CMOS wafer, the membrane preferably lies in a (100) plane, and the piezo-resistive strips are preferably oriented in <110> directions.

As illustrated in FIG. 6, the position of the piezo-resistive strips 8, 9 with respect to the membrane edge 21 (indicated in dotted line), in particular the distance "d1" between the center of the strips 8 and the membrane edge 21, may be chosen to have a maximum of resistance change of the three strips together (e.g. $\Delta R1$) when a pressure is applied. For a chosen number of piezo-resistive strips (e.g. three in the embodiment shown), and for chosen dimensions (length and width of the strips, and distance between the strips), the optimal distance "d1" in terms of maximum sensitivity w.r.t. pressure can be determined, e.g. calculated or simulated or determined in any other way, e.g. via design variation. Likewise, for a chosen number of strips 9, and for chosen dimensions thereof, an optimal distance "d2" in terms of maximum sensitivity w.r.t. pressure, can be determined. The value of "d2" can be determined independent of the value of "d1", but is dependent on the membrane size and membrane thickness T. Finite element modeling may be used to determine these "optimal" distances. However, the invention would also work with sub-optimal positions, since the formula (4) would still apply. Simulations have shown that such an optimal position may e.g. be obtained by "shifting" the resistive strips 8 about 25% over the membrane edge 21, and by "shifting" the resistive strip 9c entirely over the membrane edge 21, but other values for d1 and d2 would also work, as long as the first resistor R1 and the second resistor R2 is located "adjacent" the membrane edge 21, within a distance of at most 3 times ($\leq 3\times$) the membrane thickness T, preferably less than 2.5 times T, e.g. less than 2.0 times T, and substantially near the center of the side of the membrane, because in this region the stress is highest. Simulations have shown that, when a pressure is applied to the membrane 2, a stress gradient is established which has its maximum on the membrane 2 close to the edge 21. At the edge there is however no abrupt stop of the stress, but it decreases with distance away from the edge 21 in the direction of the bulk, and in a direction of the membrane. At a distance of about 2.0 times the membrane thickness T away from the edge, the stress on the bulk silicon is typically still about 50% of the maximum stress.

Referring back to FIG. 9, it can be seen that the resistors R1 and R2 of the first pair are thus arranged "close" together (relative to the size of the membrane 2), and it can therefore be assumed (or approximated) that the temperatures of the piezo-resistive strips of R1 and R2 are all substantially the same, say T1. Likewise, the resistors R3 and R4 of the second pair are arranged "close" together, and it can therefore be assumed (or approximated) that the temperatures of the piezo-resistive strips thereof are substantially the same, say T3, but as the resistors R3 and R4 of the second pair P2 are located "relatively far" away from the resistors R1 and R2 of the first pair P1, the temperature T3 of the second pair P2 may be different from temperature T1 of the first pair P1. This technical effect is obtained even if only one of the resistors R1, R2, R3, R4 are piezo-resistive.

Thus, by locating the strips 8, 9 of the resistors R1 and R2 "relatively close" together, more specifically such that the largest possible distance L73 defined by the strips is only a fraction (e.g. less than 50%, preferably less than 20%) of a largest dimension W (length, width, diameter etc.) of the membrane 2, the temperature difference |T1−T2| between the resistors R1, R2 would also only be a fraction of the total temperature difference which may exist over the membrane 2. Hence, the sensitivity of the pressure sensor in respect of any temperature gradient over the membrane 2 is drastically reduced, and thus the accuracy of the pressure sensor is increased.

It should be mentioned in this respect that it is not important whether the resistance of R1, R2 changes linearly with temperature or in a non-linear way, as long as the material of R1 and R2 and their temperature is substantially the same, as can be seen from formula (4). Indeed, if both R1 and R2 change according to same non-linear function with temperature T, their ratio remains the same. For the sake of completeness, it is recalled that the above described effect (of insensitivity of the bridge even if T1 < > T3) is different from the common-mode temperature rejection known in the art, whereby the bridge-structure itself is responsible for cancelling the common mode temperature of the resistors R1 to R4, provided they all have the same temperature.

Still referring to FIG. 9, it can be seen that the first resistor pair P1, comprising R1 and R2, is located adjacent and substantially in the middle of the first side S1 of the membrane 2, while the second resistor pair P2, comprising R3 and R4, is located adjacent and substantially in the middle of the second side S2. In the embodiment of FIG. 9 the first pair P1 and the second pair P2 are located on adjacent sides of the membrane, whereas in the embodiment of FIG. 11, the first pair P1 and second pair P2 are located on opposite sides of the membrane 2 (hence 180° apart). With "substantially in the middle of a side" is meant within an imaginary circle having its centre in the middle of the side, and having a diameter less than 50% of the above mentioned "dimension of the membrane" (e.g. the width of a square, the diameter of a circle, etc.), preferably less than 40%, more preferably less than 30%, even more preferably less than 20%.

It can further be seen that the orientation of the piezo-resistive strips of R1 and R2 are orthogonal to each other. The effect hereof is that, when pressure is exerted in a direction substantially perpendicular to the plane XY of the membrane 2 (in the Z-direction), a radial stress will result, as schematically depicted in FIG. 14, which will cause the value of R1 to increase, and the value of R2 to decrease (or vice versa). The piezo-resistive strips of R3 and R4 are also orthogonal to each other, but in addition, the strips of R3 are substantially parallel to those of R1, because then the radial stress on the side S2 will increase the value of R4 and decrease the value of R3, hence all resistors R1 to R4 are "cooperating" as described above, in relation to FIG. 4.

In case the membrane 2 would have a circular or elliptical or octagonal shape, the location of the first pair P1 and the location of the second pair P2 would ideally be chosen at 90° angular distance, as measured from the membrane centre. However, embodiments whereby the angular distance would be in the range of 70° to 110°, preferably in the range of 80° to 100° would also work.

The inventors have discovered that this arrangement of the resistors R1, R2, R3, R4 also reduces the effect of a uniform stress component, e.g. a stress-component substantially parallel to the plane of the membrane 2, and oriented for example from left to right as schematically depicted in FIG. 15. Such a stress may e.g. be caused due to the packaging. How would the bridge circuit of FIG. 9 react to such a stress? In this case the value of R2 and R4 would decrease, while the value of R1 and R3 would increase, hence, referring to FIG. 4, the value Vd and the value Vb would both decrease, but the value Vout would remain substantially unchanged. Hence, the embodiment of FIG. 9 is also substantially insensitive to uniform stress exerted on the membrane 2, in a non-radial direction.

Figure 11:
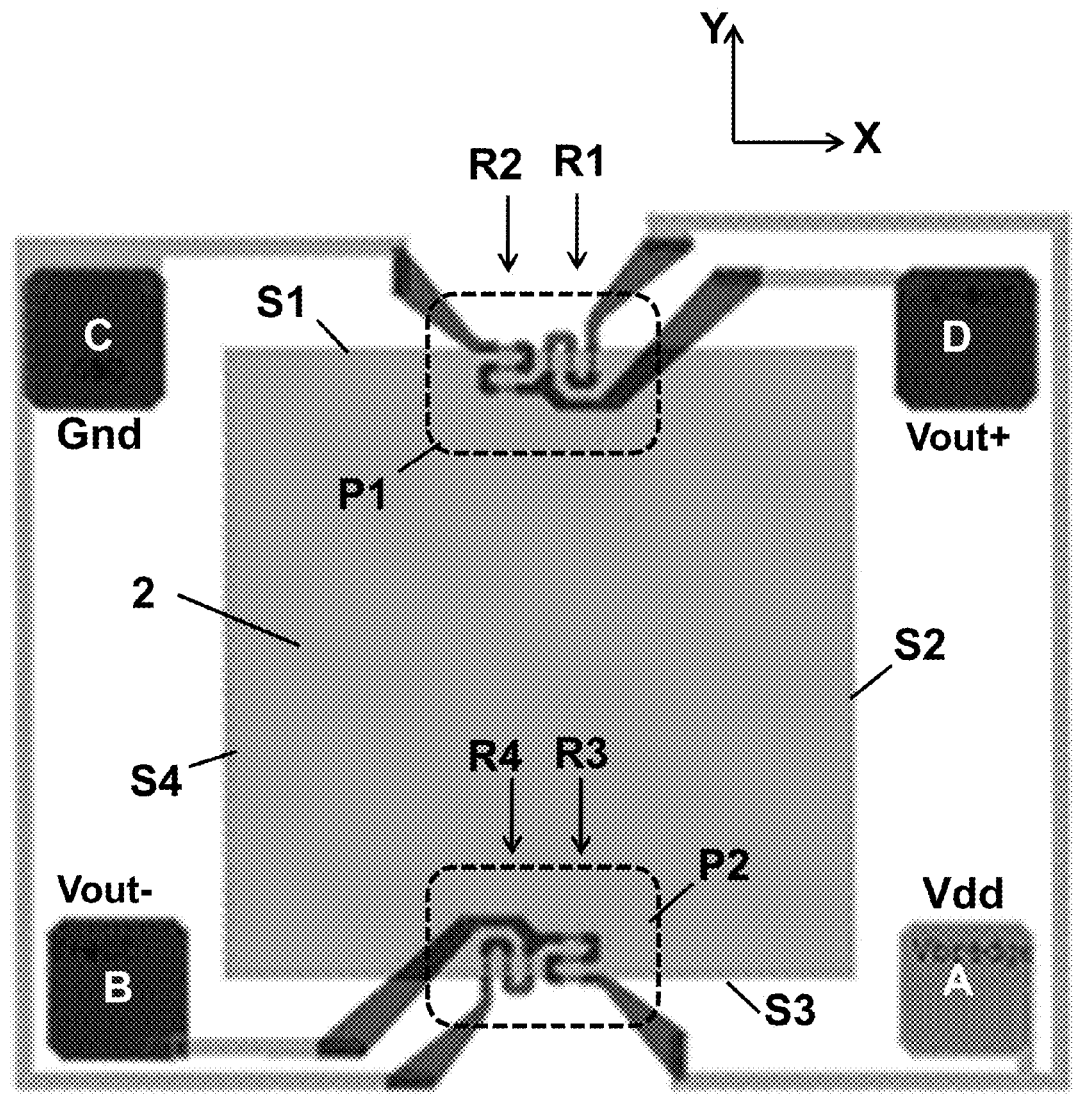
FIG. 11 shows a variant of the embodiment of the pressure sensor of FIG. 9, whereby the first and second resistor pair are located on opposite sides of the square membrane.

FIG. 11 shows a variant of FIG. 9, whereby the first and second pair P2 of resistors are not arranged at 90° angular distance (in case of a square membrane this means at adjacent sides), but at 180° angular distance, (in case of a square membrane this means at opposite sides). This embodiment also has the advantage of having a reduced sensitivity to temperature gradient (because the resistors of each resistor pair are "close" to each other), and of having a substantially maximum sensitivity (because all four resistors R1 to R4 have piezo-resistive elements, and the piezo-resistive elements are oriented so as to "cooperate" to the imbalance of the bridge when an external pressure is applied, resulting in a radial stress component (see FIG. 14), and because the resistor pairs are located at locations of maximum sensitivity on the membrane. Note however that in contrast to the embodiment of FIG. 9, in this case the strips of R1 and R4 are oriented in parallel (as opposed to orthogonal in FIG. 9), because by doing so, an external pressure resulting in the radial stress pattern of FIG. 14, would cause an increase of R1 and R4, while causing a decrease of R2 and R3.

A disadvantage of this arrangement however is that this sensor does not substantially cancel uniform stress in a direction substantially parallel to the substrate, e.g. as depicted in FIG. 15. Indeed, such a stress pattern would increase the value of R1 and R4 and decrease the value of R2 and R3, just like the radial stress pattern due to external pressure would. As a result a change in package stress will be interpreted as a change in applied pressure.

Figure 10:
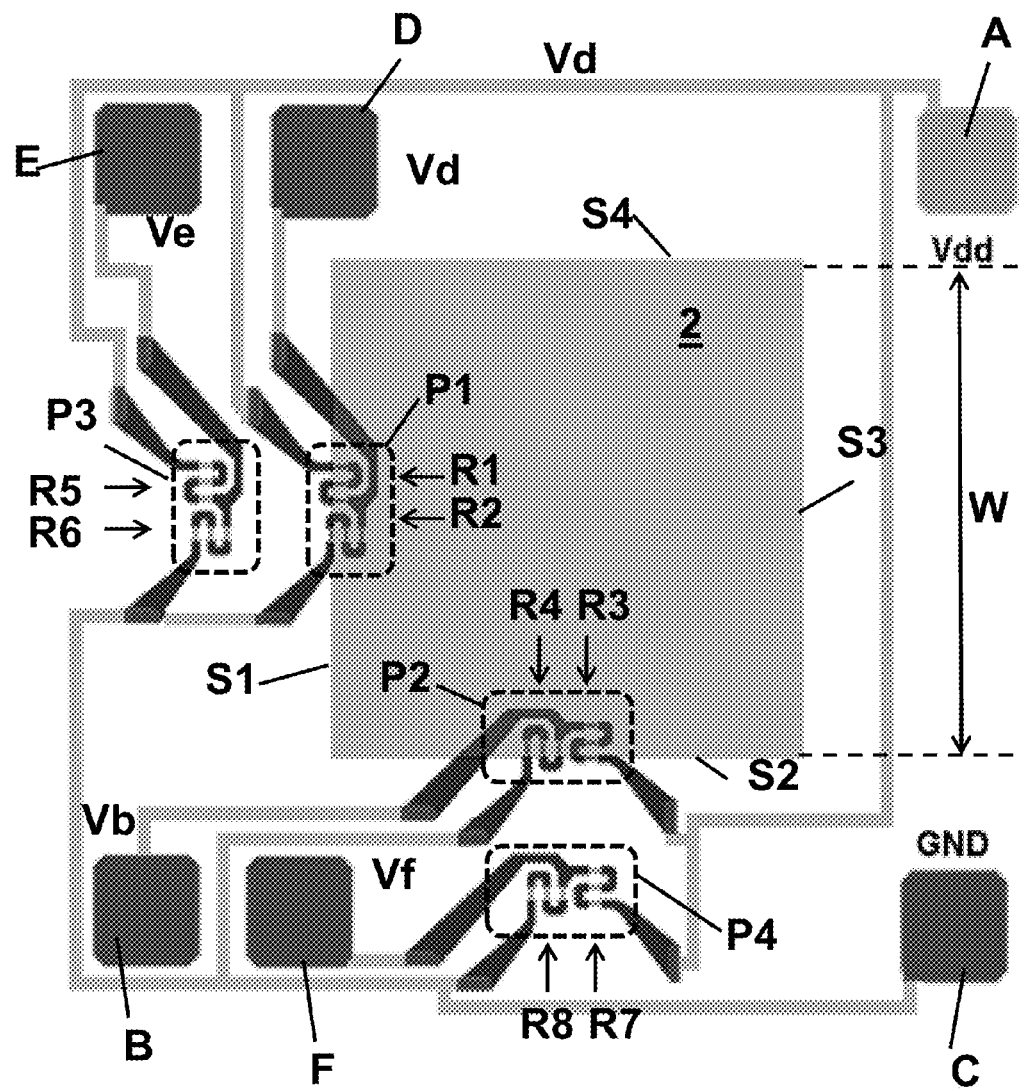
FIG. 10 shows part of a second embodiment of a pressure sensor according to embodiments of the present invention, having four resistor pairs using the pattern of FIG. 5 (or part thereof), two pairs being located on the membrane and being connected in a first bridge, and two other pairs being located outside the membrane, and being connected in a second bridge, the third and fourth pair being located in close vicinity of the first and second pair respectively.

FIG. 10 shows a second embodiment of a pressure sensor according to the present invention. Most or all of what has been said for the pressure sensor of FIG. 9 also applies to the pressure sensor of FIG. 10. In addition to the membrane 2 and the first bridge (comprising P1 and P2) shown in FIG. 9, the pressure sensor of FIG. 10 further comprises a second bridge (comprising P3 and P4). The second bridge is preferably biased by the same bias voltage Vdd and ground Gnd as the first bridge, although that is not absolutely required. The second bridge comprises two branches, one branch comprising a third resistor pair P3, the other branch comprising a fourth resistor pair P4. The third resistor pair P3 comprises two resistors R5 and R6 connected in series, the fourth resistor pair P4 comprises two resistors R7 and R8 connected in series. A third output "Ve" is provided at the node E between the fifth and sixth resistor R5 and R6. A fourth output "Vf" is provided at the node F between the seventh and eighth resistor R7, R8. The output voltages Vf and Ve at the nodes E and F provide the differential output voltage of the second bridge.

The resistors R1, R2, R3, R4 are located adjacent to and substantially in the middle of the first and second side S1, S2 of the membrane 2, as described above.

The resistors R5, R6, R7, R8 of the third and fourth resistor pair P3, P4 are located outside the membrane 2, on the bulk material, and are not intended for measuring deflections of the membrane 2, but for measuring strain due to packaging. As already indicated above, in order to be substantially insensitive of the stress exerted upon the membrane 2, the resistors R5 to R8 are preferably located at a distance from the membrane edge, which is at least 4.0 times the membrane thickness T, e.g. at least 6 times T, e.g. about 10 times T. It is noted that the temperature of resistor R5 should be substantially equal to the temperature of R6, say T5, which according to aspects of the present invention is obtained by locating R5 relatively close to R6, but the temperature of resistor R5 may be different from the temperature of R1.

By using the same (or a similar, e.g. rotated, translated, mirrored) pattern as shown in FIG. 5 or FIG. 7 or FIG. 8, the piezo-resistive strips of R5 and R6 are located "closely together" relative to the membrane size (using the same formula L73/W), and hence the temperature of the fifth and sixth resistors R5, R6 can be considered to be substantially the same, say T5. Likewise the temperature of the seventh and eighth resistor R7, R8 can be considered substantially the same. In mathematical notation, if Ti represents the temperature of resistor Ri (for i=5 to 8), then it can be assumed (or at least approximated) that T5=T6 and T7=T8, but T5 can be substantially different from T7 without unbalancing the bridge. Thus by organizing the resistors of the second (outer) bridge in pairs (rather than as individual resistors as is done in the prior art), also the second bridge is insensitive to a temperature gradient, which is a major advantage over the prior art, when using the output of the second bridge to correct the output of the first bridge.

Because the thickness T of the membrane 2, typically in the order of 10 to 100 micrometer is usually much smaller, e.g. at least ten times smaller than the size of the membrane (e.g. a membrane width in the range of 200 to 2000 micrometer), the third resistor pair P3 is located relatively "close" to the first resistor pair P1, and the fourth resistor pair P4 is located relatively "close" to the second resistor pair P2, such that the pressure sensed by the third resistor pair P3 due to the packaging is substantially the same as the pressure exerted by the package on the first resistor pair P1, and the pressure sensed by the fourth resistor pair P4 due to the packaging is substantially the same as the pressure exerted by the package on the second resistor pair P2.

Thus the value measured by the first (inner) bridge is indicative for the external pressure and package stress, while the value measured by the second bridge is indicative for the package stress only. If an identical layout is chosen for the resistors of the first and the second bridge, and if the same bias voltages are chosen for the first and second bridge, the value of the second bridge can be subtracted from the value of the first bridge to compensate for package stress. But the invention is not limited thereto, and in general, the value of the second bridge would be proportional to the package stress, and a fraction of said value can be subtracted from the output of the first bridge to compensate the zero-offset against package stress.

Although the use of a second bridge in an attempt to compensate for offset error due to package stress is already mentioned in the prior art (see EP0083496A2), experiments have shown that the offset compensation of the first bridge by the second bridge organized in the manner as disclosed in the prior art (with individual resistors distributed on the four sides of the membrane and the bulk), does not work very well, and is sensitive to a temperature gradient.

Figure 12:
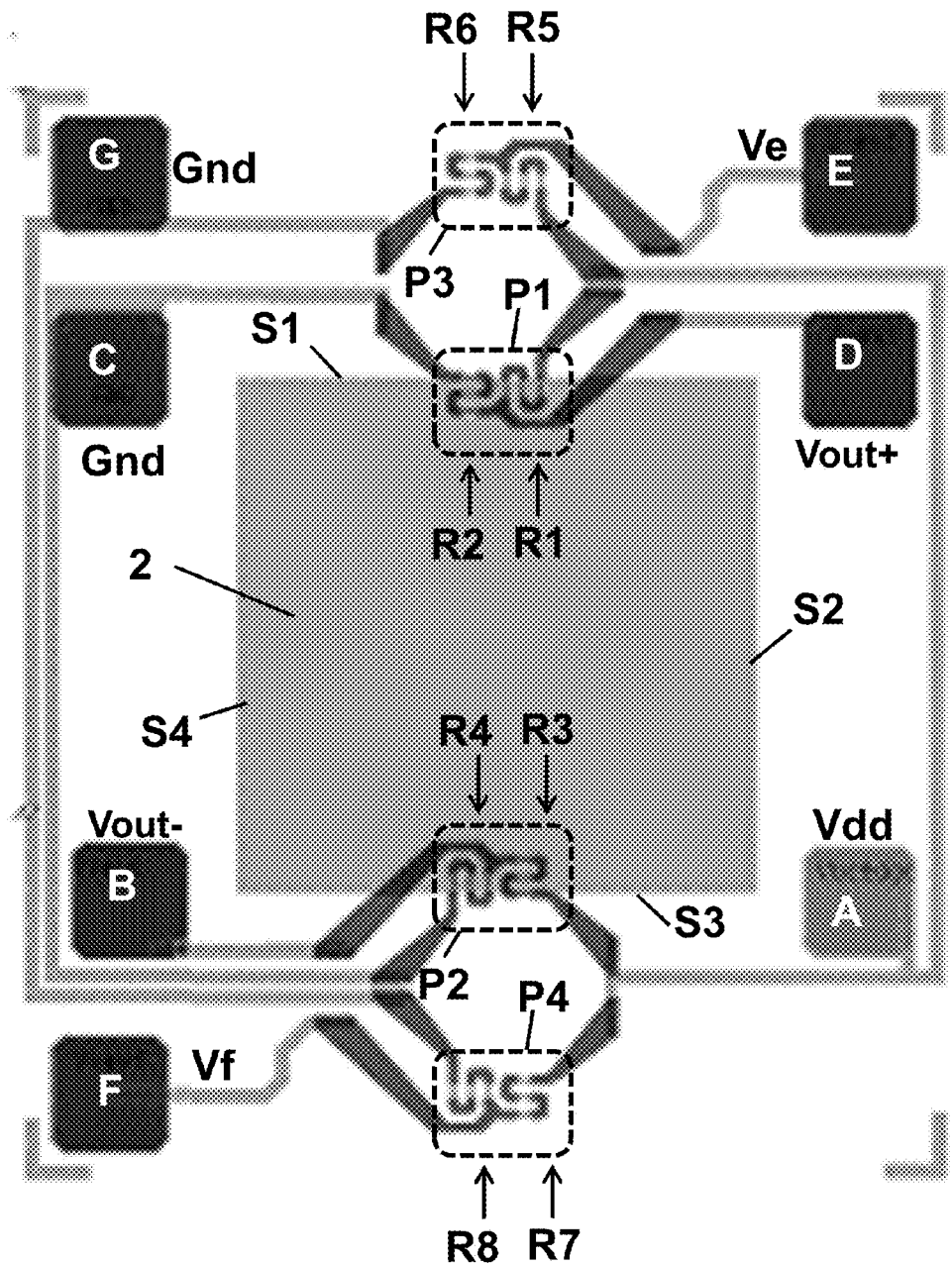
FIG. 12 shows a variant of the embodiment of the pressure sensor of FIG. 11, whereby the first, second, third and fourth resistor pairs are located on opposite sides of the square membrane.

It was found that, when the resistors of each branch of the two bridges are organized in pairs, as described in the present invention, and as shown for example in FIG. 10 and FIG. 12, the matching between the first (inner) bridge measuring the pressure of the membrane and the second (outer) bridge measuring only the package stress is at least 3.0 times better when the bridges comprises resistor pairs rather than individual resistors, which is a major improvement.

It is believed that one of the underlying reasons why the matching of the bridges organised in pairs as described herein is significantly better than the matching of the prior art bridges, is mainly related to the fact that the distance between the piezo-resistive strips within the pairs is much shorter than the distance between piezo resistive strips of the classical bridges, however, the inventors do not wish to be bound by any theory.

By locating the third pair P3 "close" to the first pair P1, automatically also the temperature of the resistors R1, R2, R5 and R6 will be substantially the same (thus T1=T2=T5=T6), although that is not absolutely required, it suffices that T1=T2 and that T5=T6. As mentioned above, the main reason for locating the third pair P3 close to the first pair P1 is to match the package stress as good as possible. Since the resistors R1 to R4 are located on the membrane 2, (or more correctly stated: a major portion of R1 and R4 is located on the membrane) they are sensitive to pressure exerted on the membrane 2 as well as to pressure exerted by the package. In contrast, since the resistors R5 to R8 are located "sufficiently far" outside the membrane 2, e.g. at least 4.0 times (≥4×) the membrane thickness T away from the membrane edge 21, they are only sensitive to the pressure exerted by the package. Hence, the second bridge comprising the resistors R5 to R8 can be used to determine the common mode pressure exerted by the package on the substrate, which common mode pressure can be used to compensate the pressure value obtained from the first bridge, using known methods.

In practice, a trade-off needs to be made with respect to the position of the third and fourth resistor pair P3, P4 in relation to the first resp. second resistor pairs P1, P2: if P3 is located "too close" to the membrane edge (and thus to P1), it provides a better indication (higher correlation) of the package pressure exerted upon the resistors of P1 and P2, but P3 will also be more sensitive to the external pressure on the membrane. If P3 is "too far" from the membrane edge, it will be substantially insensitive to the external pressure to be measured by the first bridge, but the package stress experienced by P3 may deviate more from the package stress experienced by P1 (lower correlation). As a rule of thumb, the third and fourth resistor pairs P3, P4 may e.g. be located at a distance equal to about 4.0 times (4×) to about 10.0 times (10×) the membrane thickness T.

The end result is that the pressure sensor of FIG. 10 is able to accurately measure the pressure exerted on the membrane 2, with a high sensitivity (because of 4 piezo-resistors being used), in a manner which is independent of the common mode temperature (by using bridge circuits, whereby only the ratio of resistor values is important, not their absolute values), with a reduced sensitivity to package stress (due to presence of and compensation by the second bridge, but also due to the 90° angular distance between the first & third pair and the second & fourth pair), and with a reduced sensitivity to a temperature gradient over the chip (due to the close positioning of the two-resistors of each pair within each bridge).

FIG. 12 shows a variant of FIG. 10, whereby the resistor pairs P1 and P2, and P3 and P4 are located on opposite sides of the membrane 2 instead of on adjacent sides. This embodiment can also be seen as a variant of FIG. 11, whereby a third and fourth resistor pair are added outside of the membrane. The embodiment of FIG. 12 has the same advantages as that of FIG. 10, except for the disadvantage of not reducing the uniform stress in a plane parallel to the substrate, as was described above in relation to FIG. 15.

In another variant (not shown) of the pressure sensor of FIG. 9, the pressure sensor would have a second bridge with two resistor pairs P3 and P4, located mainly on the membrane 2, on the third and fourth side S3, S4. Such a pressure sensor would measure the pressure exerted on the membrane 2 at four locations instead of only two. Such a second bridge would normally provide the same or similar values than the first bridge, and hence may be used for self-test or reliability-check (e.g. by comparing the values of both bridges), or the values may be summed or averaged for compensating local imperfections, or for increased accuracy. However, such a second bridge would not compensate for radially oriented package stress (because it does not have resistor pairs on the bulk material), but it would compensate for uniform package stress (because the resistor pairs of each bridge are at an angular distance of 90°).

In a further variant of the pressure sensor just described, the pressure sensor may have a third and a fourth bridge, located outside of the membrane for compensating radial package stress, similar to the embodiment of FIG. 10. If fact, the invention would also work if the fourth bridge were omitted.

FIG. 13 shows a variant of the embodiment of FIG. 11 having a circular membrane 2, and having the layout structure of the resistor pairs of FIG. 8. Everything which was said for the embodiment of FIG. 11 is also applicable here, except that in this case each resistor has two piezo-resistive elements instead of three, and that the membrane edge is not straight. As can be seen, the resistor pairs are arranged at 180° angular distance, as seen from the center of the membrane.

As was discussed for FIG. 11, and shown in FIG. 12, variants of the embodiment of FIG. 13 may also have a second bridge located on the bulk, for measuring and compensating package stress, or located on the membrane for redundancy reasons or for improved accuracy (by averaging, or selecting the circuit with the best performance during calibration).

Figure 16:
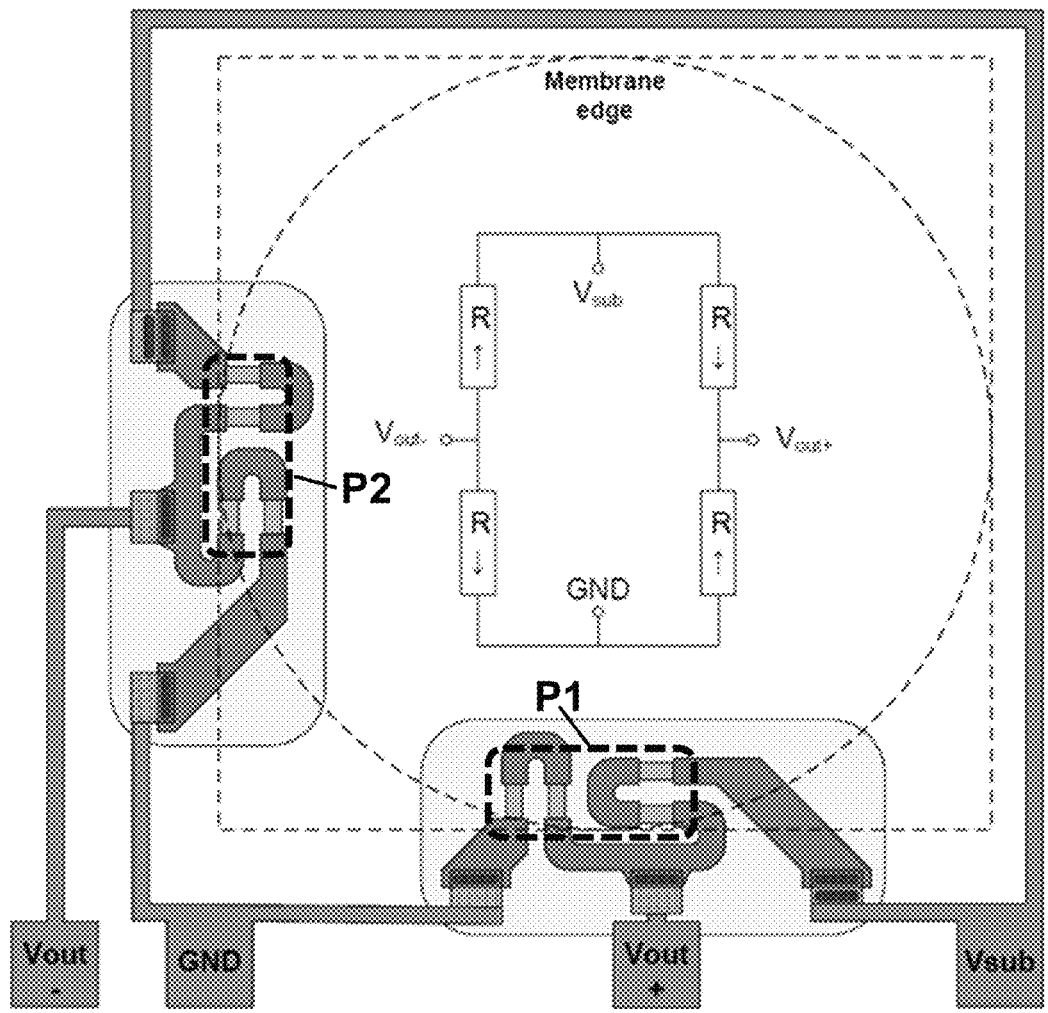
FIG. 16 shows a variant of the embodiment of the pressure sensor of FIG. 9, using the pattern of FIG. 8 (or part thereof) instead of the pattern of FIG. 5. The drawings are only schematic and are non-limiting. In the drawings, the size of some of the elements may be exaggerated and not drawn on scale for illustrative purposes.

FIG. 16 shows a variant of the embodiment of FIG. 9 having a circular membrane 2, and having the layout structure of the resistor pairs of FIG. 8. Everything which was said for the embodiment of FIG. 9 is also applicable here, except that in this case each resistor has two piezo-resistive elements instead of three, and that the membrane edge is not straight. As can be seen, the resistor pairs are arranged at 90° angular distance, as seen from the center of the membrane.

As was discussed for FIG. 9, and shown in FIG. 10, variants of the embodiment of FIG. 16 may also have a second bridge located on the bulk, for measuring and compensating package stress, or located on the membrane for redundancy reasons or for improved accuracy (by averaging, or selecting the circuit with the best performance during calibration).

| REFERENCES: | | | |
|---|---|---|---|
| 2 | membrane | 21 | membrane edge |
| 3 | corner parts | 4 | metal electrode |
| 6 | electrode lead-out regions | 73 | largest distance |
| 8 | piezo-resistive strip of first resistor | 9 | piezo-resistive strip of second resistor |
| 10 | piezo-resistive strip of third resistor | 11 | piezo-resistive strip of fourth resistor |
| P1 | first resistor pair | R1 | first resistor |
| S1 | first side of square membrane | W | width of the square membrane |
| T | membrane thickness | Vdd | supply voltage |
| Gnd | ground voltage | | |

The invention claimed is:

1. A semiconductor pressure sensor for measuring an external pressure exerted on the sensor, comprising:
   a membrane as part of a semiconductor substrate for being deformed due to the external pressure, having a membrane edge and a membrane thickness;
   a first bridge circuit comprising a first resistor pair located on or adjacent to a first side portion of the membrane, and a second resistor pair located on or adjacent to a second side portion of the membrane;
   the first resistor pair comprising a first resistor connected between a first bias node and a first output node, and a second resistor connected between the first output node and a second bias node;
   the second resistor pair comprising a third resistor connected between the first bias node and a second output node, and a fourth resistor connected between the second output node and the second bias node;
   at least one of the first and second and third and fourth resistor comprising one or more elongated piezo-resistive strips arranged for measuring deformation of the membrane due to the external pressure to be measured;
   wherein the ratio of a largest distance between a point of the first resistor and a point of the second resistor, and a largest dimension of the membrane is less than 50%;
   and wherein the ratio of a largest distance between a point of the third resistor and a point of the fourth resistor, and a largest dimension of the membrane is less than 50%,
   and
   wherein the second side portion is located at substantially 90° angular distance from the first side portion as measured from a center of the membrane, and the elongated piezo-resistive strips of the first resistor are oriented parallel to the elongated piezo-resistive strips of the third resistor; or
   wherein the second side portion is located at substantially 180° angular distance from the first side portion as measured from a center of the membrane, and the elongated piezo-resistive strips of the first resistor are oriented orthogonal to the elongated piezo-resistive strips of the third resistor.

2. The semiconductor pressure sensor of claim 1, wherein at least two of the first, second, third and fourth resistors comprise one or more elongated piezo-resistive strips arranged for measuring deformation of the membrane due to the external pressure to be measured;
   whereby the one or more piezo-resistive strips are oriented such as to cooperate to the imbalance of the bridge when a pressure is exerted on the membrane.

3. The semiconductor pressure sensor of claim 2, wherein at least three of the first, second, third and fourth resistors comprise one or more elongated piezo-resistive strips arranged for measuring deformation of the membrane due to the external pressure to be measured;
   whereby the one or more piezo-resistive strips are oriented such as to cooperate to the imbalance of the bridge when a pressure is exerted on the membrane.

4. The semiconductor pressure sensor of claim 3, wherein each of the first, second, third and fourth resistors comprises one or more elongated piezo-resistive strips arranged for measuring deformation of the membrane due to the external pressure to be measured;
   whereby the one or more piezo-resistive strips are oriented such as to cooperate to the imbalance of the bridge when a pressure is exerted on the membrane.

5. The semiconductor pressure sensor according to claim 1,
   wherein the at least one resistor comprising one or more elongated piezo-resistive strips, comprises at least two piezo-resistive strips connected in series.

6. The semiconductor pressure sensor according to claim 1, wherein the second side portion is located substantially or precisely at 90° angular distance from the first side portion, as measured from a center of the membrane.

7. The semiconductor pressure sensor according to claim 1, wherein the ratio of a largest distance between a point of the first resistor and a point of the second resistor, and a largest dimension of the membrane is less than 25%;
and wherein the ratio of a largest distance between a point of the third resistor and a point of the fourth resistor, and a largest dimension of the membrane is less than 25%.

8. The semiconductor pressure sensor according to claim 1, wherein
the membrane is substantially square, and the largest dimension is the width of the square, the first side portion is a first side of the square, and the second side portion is a second side of the square adjacent the first side; and
the first resistor and the second resistor are arranged substantially in the middle of the first side of the square;
the third resistor and the fourth resistor are arranged substantially in the middle of the second side of the square.

9. The semiconductor pressure sensor according to claim 1, wherein
the membrane is substantially circular, and the largest dimension is the diameter of the circle; or
the membrane is substantially rectangular, and the largest dimension is the larger of the length and the width of the rectangle; or
the membrane is substantially elliptical, and the largest dimension is the larger of the first and the second axis of the ellipse;
the membrane is substantially octagonal, and the largest dimension is the distance between opposite sides of the octagonal.

10. The semiconductor pressure sensor according to claim 1, wherein
the ratio of the resistance of the first resistor and the resistance of the second resistor lies in the range of 50% to 200%; and
the ratio of the resistance of the third resistor and the resistance of the fourth resistor lies in the range of 50% to 200%.

11. The semiconductor pressure sensor according to claim 1, wherein:
the second side portion is located at 90° angular distance from the first side portion as measured from a center of the membrane, and
the elongated piezo-resistive strips of the first resistor are oriented orthogonal to the elongated piezo-resistive strips of the second resistor; and
the elongated piezo-resistive strips of the third resistor are oriented orthogonal to the elongated piezo-resistive strips of the fourth resistor; and
the elongated piezo-resistive strips of the first resistor are oriented parallel to the elongated piezo-resistive strips of the third resistor.

12. The semiconductor pressure sensor according to claim 1, wherein:
the second side portion is located at 180° angular distance from the first side portion as measured from a center of the membrane, and
the elongated piezo-resistive strips of the first resistor are oriented orthogonal to the elongated piezo-resistive strips of the second resistor; and
the elongated piezo-resistive strips of the third resistor are oriented orthogonal to the elongated piezo-resistive strips of the fourth resistor; and
the elongated piezo-resistive strips of the first resistor are oriented orthogonal to the elongated piezo-resistive strips of the third resistor.

13. The semiconductor pressure sensor according to claim 1, arranged on a CMOS wafer, whereby the membrane is located in an plane, and at least one of the piezo-resistive elements is oriented in the <110> direction.

14. A semiconductor device comprising a semiconductor pressure sensor according to claim 1.

15. A semiconductor pressure sensor for measuring an external pressure exerted on the sensor, comprising:
a membrane as part of a semiconductor substrate for being deformed due to the external pressure, having a membrane edge and a membrane thickness;
a first bridge circuit comprising a first resistor pair located on or adjacent to a first side portion of the membrane, and a second resistor pair located on or adjacent to a second side portion of the membrane;
the first resistor pair comprising a first resistor connected between a first bias node and a first output node, and a second resistor connected between the first output node and a second bias node;
the second resistor pair comprising a third resistor connected between the first bias node and a second output node, and a fourth resistor connected between the second output node and the second bias node;
at least one of the first and second and third and fourth resistor comprising one or more elongated piezo-resistive strips arranged for measuring deformation of the membrane due to the external pressure to be measured;
wherein the ratio of a largest distance between a point of the first resistor and a point of the second resistor, and a largest dimension of the membrane is less than 50%;
wherein the ratio of a largest distance between a point of the third resistor and a point of the fourth resistor, and a largest dimension of the membrane is less than 50%; and
wherein the semiconductor pressure sensor further comprises
a second bridge circuit comprising a third resistor pair arranged at the first side portion of the membrane but outside of the membrane, and a fourth resistor pair arranged at the second side portion of the membrane but outside of the membrane;
the third resistor pair comprising a fifth resistor connected between the first bias node and a third output node, and a sixth resistor connected between the third output node and the second bias node;
the fourth resistor pair comprising a seventh resistor connected between the first bias node and a fourth output node, and an eighth resistor connected between the fourth output node and the second bias node;
at least one of the fifth and sixth and seventh and eighth resistor comprising one or more elongated piezo-resistive strips arranged at a distance from the membrane edge of at least four times the membrane thickness for only measuring stress exerted by packaging on the semiconductor substrate; and
circuitry for compensating the value measured by the first bridge using the value measured by the second bridge.

16. The semiconductor pressure sensor of claim 15, wherein
each of the fifth and sixth and seventh and eighth resistor comprise one or more elongated piezo-resistive strips arranged for measuring the stress caused by packaging on the semiconductor substrate.

17. The semiconductor pressure sensor of claim 16, wherein
the elongated piezo-resistive strips of the fifth resistor and of the sixth resistor are oriented in orthogonal directions, and wherein the elongated piezo-resistive strips of the fifth resistor are parallel or orthogonal to the elongated piezo-resistive strips of the first resistor;
the elongated piezo-resistive strips of the seventh resistor and of the eighth resistor are oriented in orthogonal directions, and wherein the elongated piezo-resistive strips of the fifth resistor are parallel or orthogonal to the elongated piezo-resistive strips of the first resistor.

18. The semiconductor pressure sensor according to claim 15, wherein each of the first, second, third, fourth, fifth, sixth, seventh and eighth resistor have the same number of piezo-resistive strips, and wherein the dimensions of all these piezo-resistive strips are identical.

19. The semiconductor pressure sensor according to claim 15, wherein:
the second side portion is located at 90° angular distance from the first side portion as measured from a center of the membrane, and
the elongated piezo-resistive strips of the first resistor are oriented orthogonal to the elongated piezo-resistive strips of the sixth resistor; and
the elongated piezo-resistive strips of the seventh resistor are oriented orthogonal to the elongated piezo-resistive strips of the eighth resistor; and
the elongated piezo-resistive strips of the fifth resistor are oriented parallel to the elongated piezo-resistive strips of the seventh resistor, and
the elongated piezo-resistive strips of the fifth resistor are oriented parallel to the elongated piezo-resistive strips of the first resistor.

20. The semiconductor pressure sensor according to claim 15, wherein:
the second side portion is located at 180° angular distance from the first side portion as measured from a center of the membrane, and
the elongated piezo-resistive strips of the fifth resistor are oriented orthogonal to the elongated piezo-resistive strips of the sixth resistor; and
the elongated piezo-resistive strips of the seventh resistor are oriented orthogonal to the elongated piezo-resistive strips of the eighth resistor; and
the elongated piezo-resistive strips of the fifth resistor are oriented orthogonal to the elongated piezo-resistive strips of the seventh resistor; and
the elongated piezo-resistive strips of the fifth resistor are oriented parallel to the elongated piezo-resistive strips of the first resistor.

* * * * *